United States Patent [19]

Goodwin, Jr.

[11] Patent Number: 4,636,940
[45] Date of Patent: Jan. 13, 1987

[54] LOGIC ANALYZER USING SOURCE PROGRAM OR OTHER USER DEFINED SYMBOLS IN THE TRACE SPECIFICATION AND THE TRACE LISTING

[75] Inventor: Bryce S. Goodwin, Jr., Colorado Springs, Colo.

[73] Assignee: Hewlett-Packard Company, Palo Alto, Calif.

[21] Appl. No.: 814,013

[22] Filed: Dec. 20, 1985

Related U.S. Application Data

[63] Continuation of Ser. No. 481,010, Mar. 31, 1983, abandoned.

[51] Int. Cl.$^4$ .............................................. G06F 11/34
[52] U.S. Cl. ...................................... 364/200; 371/19
[58] Field of Search ............... 364/200, 900, 486, 580; 324/73 R, 73 AT; 371/17, 19

[56] References Cited

U.S. PATENT DOCUMENTS

| | | | |
|---|---|---|---|
| 4,099,230 | 7/1978 | Mead | 364/200 |
| 4,205,370 | 5/1980 | Hirtle | 364/200 |
| 4,250,262 | 2/1981 | Haag et al. | 364/900 |
| 4,381,563 | 4/1983 | Groom, Jr. et al. | 324/73 R |
| 4,434,488 | 2/1984 | Palmquist et al. | 324/73 R |
| 4,533,997 | 8/1985 | Furgerson | 364/200 |

Primary Examiner—James D. Thomas
Assistant Examiner—David L. Clark
Attorney, Agent, or Firm—Edward L. Miller

[57] ABSTRACT

A logic state analyzer allows a user to include symbols defined in source program listings, as well as other specially defined symbols, in the trace specification. Such symbols represent unique individual values or ranges of values. The resulting trace list includes these symbols, and where possible, all address, operands, etc., are expressed in such terms. When those symbols are relocatable entities produced by compilers and assemblers the result is that the user is freed from having to duplicate the relocation process to specify absolute values in the trace specification, and later reverse it to interpret absolute values in the listing in terms of symbols originally defined in the source programming. A further result is that the states within an arbitrary finite state machine can be assigned descriptive labels, with the trace specification and trace listing subsequently expressed in those terms. Trace values can also be represented relative to a symbol. The same principles are extendable to handle memory segment offsets invoked by memory management units that automatically convert a relocated virtual address emitted by a processor into a dynamically adjusted run time physical address actually sent to the memory. According to a preferred embodiment of the invention the analyzer makes use of various symbol tables produced by any associated assemblers and compilers, as well as of any additional special symbol definitions desired by the user. The analyzer provides absolute values for these symbols by application of the load map produced during the relocation of the various programs into the target system monitored by the logic analyzer.

12 Claims, 6 Drawing Figures

LOGIC ANALYZER USING SOURCE PROGRAM OR OTHER USER DEFINED SYMBOLS IN THE TRACE SPECIFICATION AND THE TRACE LISTING

CROSS REFERENCE TO RELATED APPLICATION

This application is a continuation of application Ser. No. 481,010, filed Mar. 31, 1983, now abandoned.

FIELD OF THE INVENTION

The subject matter of the present invention pertains to improvements in logic state analysis, and may apply to both logic state analyzers and the debuggers used in conjunction with emulators.

BACKGROUND AND SUMMARY OF THE INVENTION

The development of executable code for processor based systems frequently involves the use of compilers and assemblers that produce relocatable object code. When such programs are subsequently linked and loaded a trace listing provided by a logic state analyzer can be at best tedious to appreciate, and at worst extremely difficult to follow. Even a reverse assembler can not replace a reference to an arbitrary address with the corresponding symbol used in the original source program. To do that requires an appreciation on the part of the user of how the various software tools interact, and of how they modify the relocatable object code to produce a final absolute value. A considerable amount of tedious nondecimal arithmetic may be required to relate the actual events reflected in the trace to a collection of source program listings. The situation would be bad enough in cases where the hardware in the target system is known to be good, and what is being debugged is simply the software. But in many development situations there may be bugs in both the hardware and the software. This makes it especially important to be able to rely on the trace for information about what really happened, as there may well be a discrepancy between actual events and the legitimate aims of even a properly written program. Under these circumstances it would be less wise to think of the trace as a hardware version of the program listing, and more useful to think of the program listing as a guide to understanding the trace. In these types of situations the extra overhead of "unrelocating" a trace can be particularly burdensome. It would be especially desirable if all absolute values for addresses and operands in the trace were replaced with notations involving the symbols used by the programmer in the original source programs. Such symbols might refer to individual locations or to ranges of locations. It would be useful if similar symbols could be defined in addition to the ones found in the source listings, without having to edit the sources to include them. It would also be helpful if references to original source program line numbers could be included in the trace, or even actual source lines. This would aid a great deal in allowing the user to follow overall program flow.

Another development or troubleshooting situation pertinent to the invention can arise in connection with the operation of finite state machines. A trace of such a state machine is a sequential series of states: e.g., 001001, 010001, 010011, etc. It is frequently the case these states can be given labels, such as "INC_P_REG", (increment P register), "WAIT_MEMC", (wait for Memory Complete), or STM (Start Memory Cycle). It would be desirable if a logic analyzer could provide a listing of the trace in terms of such labeled states. Each state in the listing would either be a label or a value relative to a label. In the latter case there might be several states in some process, say a read memory cycle. The label RMCY might refer to the first state in the process. RMCY+3 would denote the fourth state therein without having to invent labels for every separate state in the process (and by implication, in the entire machine).

The ability of the logic state analyzer described herein to integrate source program symbols and source lines into the trace listing arises from giving that analyzer access to the symbol tables produced by any compiler or assembler that produced the code (whether absolute or relocatable) and by giving the analyzer access to the decisions made by the linker or relocating loader. Using this information the analyzer can determine by various inspection processes what symbols to use in the trace listing.

A further benefit emerges from the ability to do this. It is then also possible to at once expand and simplify the process of defining the trace specification for the analyzer. The trace specification tells the analyzer under what conditions to commence the trace and exactly what type of information to include therein. With the aid of the invention it is possible to use source program symbols in the trace specification without having to learn what their absolute values are at run time. This is quite useful, as those absolute values are apt to change as bugs are found and fixed, or as different versions of the software are developed and tested. But an analyzer constructed to take advantage of the various symbol tables and the load map need not have its trace specification altered merely because one or more programs are of different lengths than before, or because the programs are loaded in a different order. The symbolic nature of a "relocatable trace specification" makes that unnecessary.

These principles may be extended to apply to logic state analysis performed upon target systems that incorporate memory management units. In such target systems the relocated addresses issued by the processor are virtual addresses that are further modified in real time by the memory management unit as the processor runs. The modified addresses are the actual physical addresses sent to the memory. Their values are contingent upon run time conditions reflecting what parts of memory are allocated to which programs or tasks. These allocations are dynamic, and generally cannot be given in advance as fixed absolute offsets to be applied to the relocated addresses present at run time. Those relocated address are themselves offset by some relocation base from the relocatable addresses issued by the assembler or compiler, as mentioned above. Thus, such a memory managed address involves some absolute value that results from dynamically offsetting a relocated value that is already offset by a fixed amount from the relocatable value appearing in the source listings.

The dynamic offsets mentioned above need not be entirely private to processes within the target system, and therefore mysterious to the logic state analyzer. The symbols representing the various dynamic offsets can be defined to the logic state analyzer. Then provided certain criteria pertaining to keeping public knowledge of the offsets current (a task specific to the nature of the target system) a logic analyzer constructed in accordance with a preferred embodiment to be described can continuously adjust during run time the "real" absolute trace specification to match the symbolic one entered by the user. In like fashion it also can properly insert source symbols into the trace listing, even though the trace pertains to a program whose position in memory was determined dynamically at run time.

DESCRIPTION OF THE PREFERRED EMBODIMENT

Figure 1:
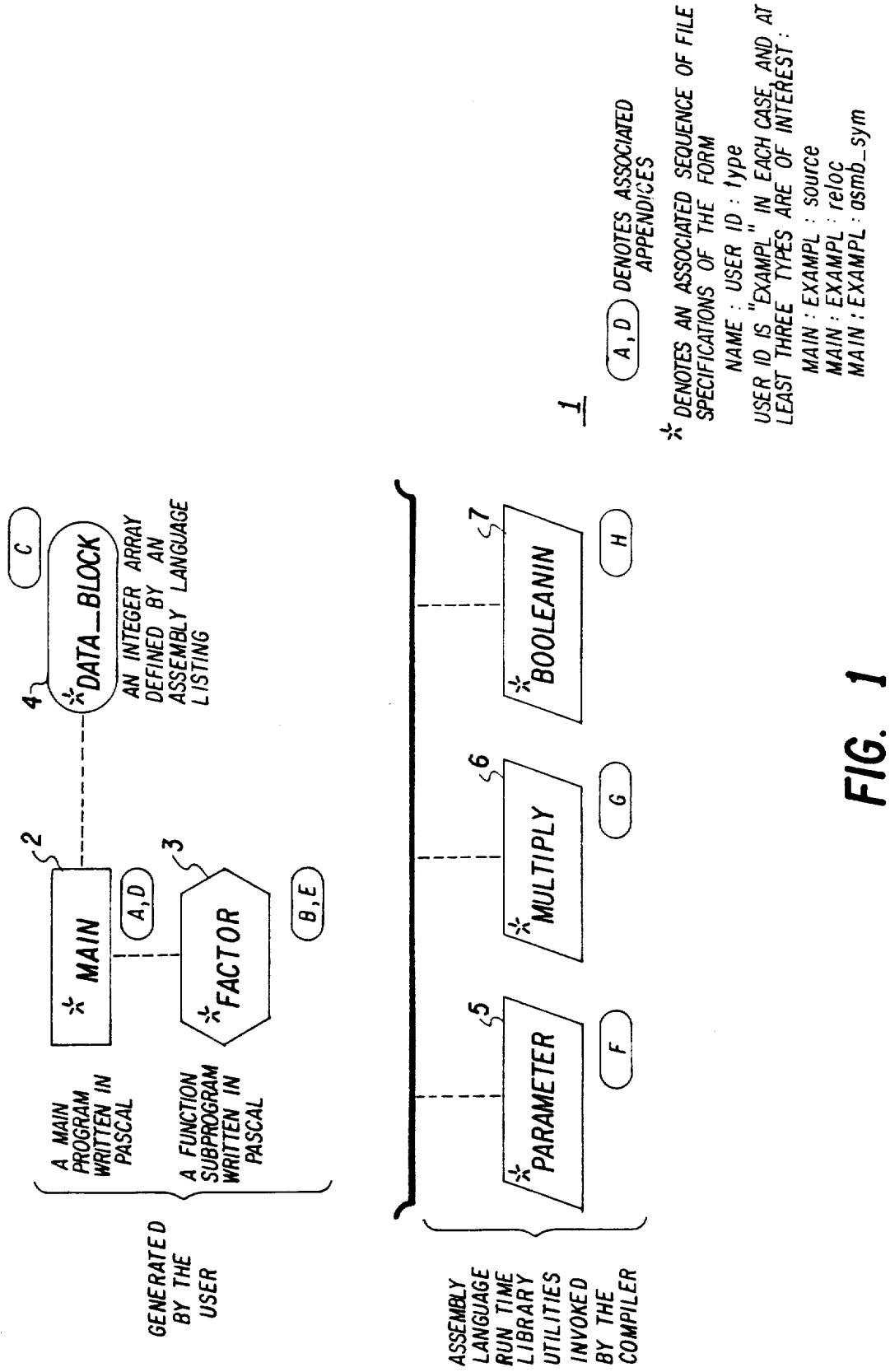
FIG. 1 is an idealized schematic representation of the relationship between certain programs executed as a workpiece to illustate the various operational features of the invention.

FIG. 1 is a block diagram of the functional relationship between certain component portions of a simple computer program 1 constructed as a workpiece to illustrate the various operational aspects of the invention. The compilation and execution of the program of FIG. 1 provides an example environment within which the operation and utility of the invention is explained. Appendices A through U pertain to that explanation. Following that, the internal operation of the invention is discussed in connection with FIGS. 2 through 6.

Turning now to the workpiece program 1 of FIG. 1, a main program 2 and an associated subprogram 3 cooperate with a data structure 4 named "DATA—BLOCK". Both the main program 2 and the subprogram 3 are written in PASCAL, although any of a number of other programming language might have been used, as well. The name of the main program is "MAIN", while the name of the subprogram 3 is "FACTOR". Associated with these two Pascal programs and their data structure are three utility programs from the run-time library invoked by the PASCAL complier during compilation of the programs MAIN and FACTOR. These are a parameter passing routine 5 named PARAMETER, a multiplication routine 6 named MULTIPLY, and a routine 7 named BOOLEA-NIN that checks if a specified bit in a specified word is set. BOOLEANIN finds use, for example, in the evaluation of PASCAL "IF" statements. Each of these program elements will now be briefly considered in turn.

Turning now to page i of Appendix A, shown there is the PASCAL source listing of the program MAIN 2. What the program MAIN does is fill the data structure DATA—BLOCK with the factorials of the consecutive integers zero through twenty. To do this if references an external integer array conveniently named DATA—BLOCK. The index into the array is named INDEX, and an external function FACTORIAL returns the value n! for a supplied integer n. A simple FOR loop assigns the factorial of the value of the index to the location identified by the index. This is done for pointer values of from zero to twenty.

The source listing in PASCAL of the function subprogram FACTOR is shown on page i Appendix B. We shall not dwell upon what a factorial is, or upon the logical arrangement of the subprogram FACTOR 3. Programs MAIN 2 and FACTOR 3 are presented merely as portions of a workpiece in an example situation. The situation involves either verification or troubleshooting of the operation of FACTOR. More specifically, the example will involve tracing the operation of the function FACTORIAL upon a supplied value of three. We will find that this will involve such things as passing the parameter NUMBER to the function FACTORIAL (using PARAMETER), using BOOLEA-NIN to accomplish a portion of the IF statement on line ten, and the use of MULTIPLY in line twelve. We mention these things because it is by examining the associated portions of a trace produced by a logic state analyzer constructed in accordance with the invention that exactly what happens during such key portions of FACTORIAL can be observed. In short, the idea is to observe the input, the output and some of the important points inbetween. To briefly look ahead for a moment, why this is conventionally easier said than done will be the subject of Appendix L, and why with the aid of the invention it is as easily done as said the subject of the remaining Appendices. But for now, we must continue with the placement of our example workpiece program into the environment of an actual system so that tangible actual results can be explained and compared.

To continue then, page i of Appendix C is a commented assembly language program DATA—BLOCK that satisfies the "external" referenced in MAIN, and provides for the storage requirements of the integer array. The operative portion of DATA—BLOCK is line twenty-one. There a "BSS 21" instruction reserves twenty-one words, the first of which is associated with the symbol DATA—BLOCK. Those familiar with assemblers will recognize that the "program" DATA—BLOCK is a program in the sense that it is a text file that may be assembled, even though it does not generate any executable code. What it does do that is of interest in the present example is create a symbol table of all the assembly language labels in the program. One of those (in fact, the only one) is DATA—BLOCK. That is of future interest. A collateral point of interest is that the "BSS 21" instruction nonetheless increments a program size value that later has the effect of reserving those twenty-one words by the simple expedient of making DATA—BLOCK appear to be twenty-one words long, even though those words don't contain any code generated by the assembler.

To run the workpiece program 1 programs MAIN 2 and FACTOR 3 must be compiled by an appropriate PASCAL compiler and DATA—BLOCK 4 must be assembled by an appropriate assembler (i.e., ones for the machine language of the processor in the target system that is to execute the workpiece program). Then the whole works must be relocated and loaded. The workpiece program can then be executed. During that execution a logic state analyzer can respond to the occurrence of certain predefined conditions (defined with a trace specification) to selectively trace all or only selected events (we will select all events). A format specification matches the logical constructs of "address", "data", and "status" to particular groupings of the electrical signals monitored by the logic state analyzer. The resulting trace is a record of system activity in the vicinity of conditions defined in the trace specification. In the traces that appear in the various appendices to follow the "trigger event" is the third item in the trace, so that the bulk of the trace shows what happened subsequent to the triggering event. But first, the programs MAIN 2 and FACTOR 3 must be compiled and loaded. Appendix C has already shown the result of assembling DATA_BLOCK 4.

With this in mind, consider the expanded compiler listings of Appendices D and E produced by compiling the programs MAIN 2 and FACTOR 3. Our ultimate goal for the example under construction is to obtain a trace for the following trace specification (which we render here in plain English): "Get ready to start the trace when INDEX is assigned the integer value three and then trigger the trace when the address equals FACTORIAL and status equals opcode (i.e., the first instruction in the object code for FACTORIAL is being fetched for execution)." To put such a trace specification into effect one must not only translate the desired meaning into an appropriate collection of switch settings and keystrokes, etc., according to the syntactical idiosyncracies of the particular logic state analyzer at hand, but one must also supply particular (i.e., absolute) addresses and values for such things as FACTORIAL and INDEX. And should FACTOR invoke any other routines, then the user must ordinarily be prepared to translate addresses in those portions of the trace into meaningful locations in those invoked routines. To do this he would use a load map provided by the linker or relocating loader to learn which routine any such address fell within, and then study the compiler listing for that routine to follow what activity is represented by the trace.

In connection with these activities it will be noted that several types of items of interest appear in the listings of Appendices D and E. At the far left side of each listing and in a column labeled "location" is the relocatable address for each word of code emitted by the compiler. In a column labeled "source line" appears the line number in the original PASCAL source listing that caused the associated machine instructions. That line of source is listed, with resulting machines code shown below it. Note that symbols defined by the user in his source programming, such as INDEX at line twenty-six of page i of Appendix D (which relates to line eighteen of the PASCAL source listing of MAIN), results in code that uses the symbol INDEX. But that use of INDEX now needs an implementing definition in the context of an executable machine language program. This is done at line forty-two of page i of Appendix D, with a "BSS 1" whose hexadecimal relocatable address is 0010H. To carry out the planned example using a conventional logic state analyzer one must replace INDEX with the final relocated value for 0010H assigned to the compiled code for MAIN. And that is just one instance of such correspondence out of several. A similar thing needs to be done to actually specify in a conventional trace specification what is the absolute address of the first instruction executed in FACTOR.

As if this were not bad enough, it can easily get worse; and in our example, it does. Recall the utility programs PARAMETER 5, MULTIPLY 6 and BOOLEANIN 7. The compiler produces code that uses those routines; see the JSM instructions at lines fourteen, twenty-two and thirty-eight on page i of Appendix E. The trace that is produced in our example includes such JSM's and their associated activity. This is not unreasonable, in that if something were wrong it might be necessary to delve into the operation of these or other utility routines to understand the nature of the failure.

Now in some installations the utilities in the run time library might only be just so much relocatable machine code programs whose real meanings remain forever a mystery. A more civilized approach is for the run time library to contain not only the relocatable code for each utility, but also either the source itself or a text file containing the expanded compilation. If this latter were available it would make the task of following each step through a complete trace at least no more difficult than it would be if there were no such library utilities invoked by the compiler. That is to say, it becomes doable, but not necessarily easy.

Appendices F, G and H are the assembler listings for the three utility routines PARAMETER 5, MULTIPLY 6 and BOOLEANIN 7, respectively. The details of how those programs operate are not terribly pertinent to an understanding of the import of our example, and will be left to an investigation by the interested reader.

Appendix I is a load map indicating where, for the particular example under consideration, each of the user programs MAIN through DATA_BLOCK and the library programs BOOLEANIN through MULTIPLY was loaded for execution. The column labeled "PROGRAM" contains the hexadecimal values at which each block of code begins.

Traditionally, a load map such as the one of Appendix I is a virtual necessity when tracing program flow described with relocatable listings, as the following examples pertaining to Appendices J, K and L show. Appendix J is a format specification that tells the logic analyzer which electrical lines (i.e., which probes for each of the various probe pods) are address lines, which are data lines, and which are status lines, etc. In the present example these collections are also labeled "Address", "Data" and "Status", respectively. The term used herein to refer to such symbols as "Address" pertaining to the address collection of signals is the noun "data label." As will be described shortly data labels such as "Status" have associated therewith pluralities of values; there is more than one status. (These various values can be represented symbolically also, and may be arranged into symbol maps.) The format specification also identifies the electrical logic polarities and threshold levels the signals are expected to obey. Appendix K is a trace specification defining the nature of the information to be recorded by the logic state analyzer while it monitors the execution of the workpiece program. We shall turn to just what that is and why it is of interest in a moment.

Both Appendices J and K pertain to a logic state analyzer such as Hewlett-Packard Company's 64620S Logic State/Software Analyzer for use with the HP 64000 Logic Development System. The target system which the trace is for is one that includes a "BPC" (Binary Processor Chip) as the microprocessor. And although it is not particularly necessary to study the properties of the BPC to appreciate the example under construction, those interested or wishing a description of its instruction set, bus structure and internal architecture may find these described in considerable detail in U.S. Pat. No. 4,180,854. See col's 152 through approximately 200, FIGS. 44 through 132Cc.

To return now to the example under construction, the high level description of what the trace specification of Appendix K means is "Get ready to start the trace when INDEX is assigned the integer value three and then trigger the trace when the address equals FACTORIAL and status equals opcode." To create a trace specification with such a meaning one must not only follow the proper syntactical conventions such as "enable_after" and "on Address", but one must also correctly supply certain definite values: "enable_after Address=???" That is, the user has to come up with the "8012H" in line two of Appendix K. In this particular example the "8012H" is found by noticing that MAIN is loaded beginning at 8002H and that INDEX is at 10H (relocatable) in MAIN: 8002H plus 10H equals 8012H. And while this is not a formidable task in itself, such arithmetic may be needed in numerous places when interpreting the trace, so that following the flow of the program listing through the trace is rather like being nibbled to death by mice. Nor would it necessarily do any good to commit 8002H to memory and learn to add and substract by sight in hexadecimal. For as soon as any changes are made to the programs (which might happen many times during the course of a major project) there would appear new relocatable addresses which would likely be relative to entirely different relocation bases.

That then, is the general situation pertaining to Appendix L, which is an abbreviated rendition of the trace obtained in accordance with Appendices J and K for the programs of Appendices A through H and the load map of Appendix I.

Let us now briefly consider a portion of Appendix L. Notice that at line "trigger" on page i of Appendix L there occurs "08013 LDA 8030". According to the load map of Appendix I address 8013H is the start of the program FACTOR. At line +004 there is a "JSM 806D", followed by a change of address to 806DH at line +006. Looking only at the trace of Appendix L does not answer the question "What is 806DH?" If this JSM were of interest, what would one do to answer that question is to first notice by an inspection of the load map (Appendix I) that 806DH falls between 8069H and 808FH, so that the absolute address 806DH refers to something in PARAMETER. The load base for PARAMETER is 8069H. The referenced location minus the load base is 0004H, which is a relocatable location in PARAMETER. Now by looking at line forty-nine in the assembler listing for PARAMETER (page ii of Appendix F), notice that (relocatable) location 0004H is assigned the label PARAMETER_ENTRY. Therefore, "JSM 806D" is really "JSM PARAMETER_ENTRY."

Similar analyses apply to other address changes (JMP's, JSM's, etc.) and any associated RET's. Various such instances can be located in Appendix L, although for the sake of brevity we shall content ourselves with the one given concerning 806DH. We shall have occasion to use that instance again to illustrate the utility of the invention. It is to that illustration which we now turn our attention.

An additional "map specification" supplied to the logic state analyzer by the user, done at generally the same time as the user supplies the format and trace specifications, allows the analyzer to perform the relocation needed for symbolic trace specification, as well as the "un-relocation" needed for creation of the symbolic trace listing. Appendix M contains such a map specification having two symbol maps, each of which relates various symbols to a single value or range of values. A single value may be uniquely specified in any base, or may also be non-uniquely specified in any base by the inclusion of "don't care" characters. These values are absolute, and are obtained either from a load map or from abolute listings.

In the general case the map specification may contain a collection of one or more such symbol maps. The reason that more than one symbol map may be needed is that the symbols generally represent logically disjoint phenomenea such as "address" and "status." For example, in the case of the BPC microprocessor mentioned earlier, an address of zero represents the A register while a status of zero (for a given choice of how to group certain control lines) represents a memory write cycle. It is this possibility of separate and independent meanings for the same value that requires partitioning of the various types of symbols into separate collections. These collections generally reflect the functional division of labor exhibited by the various signals going to and from the processor. However, it is not absolutely necessary that the actual electrical signals themselves be disjoint; what is required is logical independence. In the BPC, for example, the address and data lines are one and the same, but the different types of information occur at different times. A property called "clock qualification" (which is explained in U.S. Pat. No. 4,338,677, issued to Morrill on July 6, 1982) provides the ability for a logic state analyzer to demultiplex logically separate but electrically common entitles in such situations.

Referring specifically now to Appendix M, at line six the symbol FACTORIAL is defined as the single unique absolute value 8013H. At line seven the symbol Z is defined as the range of absolute values 22H through 0C2H. Any value falling within that range will appear in the trace listing as a value relative to some reference location which itself may or may not actually be within the range. (The reference locations which usually have the greatest utility are the start of the range, the end of the range, and zero. But other values are at least conceivable, and such values are allowed and implemented.) Values within Z, for instance, will appear in the trace listing as the symbol Z plus or minus an offset, where the offset is relative to 42H. This feature is useful in instances where the symbol represents a compiler heap or perhaps an array, neither or whose indices are zero.

At line eight of Appendix M the symbol MAIN is defined as the absolute range 8002H through 8012H, relative to the start of the range. At line fourteen the symbol STACK is defined as the absolute range 0F9F0H through 0FA17H, relative to the end of the range.

And finally, at line 31 the symbol Error is defined as the nonunique value 1XXXB. Any value in the range 1000 binary to 1111 binary will appear in the trace listing as simply the symbol Error.

In a preferred embodiment the map specification may be entered in either of two ways. In the first way the user gathers the relevant information provided by various software tools (assemblers, compilers, linkers, etc., some of which may run on disparate equipment in various locations other than the target system) and then constructs a table of information corresponding to the desired map specification. He then keys this information into the logic analyzer. For example, in a microprocessor controlled logic analyzer, such as the HP 64620S, he may use a series of keystrokes similar to the ones of the entry example shown in Appendix M. These amount to syntaxes for manual entry of the map specification. A second way of entering the map specification involves the user's preparation of a properly formatted table or tables of information within a file on some mass storage medium. The map specification may then be communicated to the analyzer by mounting that disc or tape into a drive therein and instructing the analyzer by a suitable syntax to read that file to obtain the map specification. Alternatively, the file could be transmitted over a suitable data link, such as RS-232 or IEEE 488.

In conjunction with the addition of a map specification, an alteration to the associated format specification is desirable. The changed format specification is shown in Appendix N, which differs somewhat from the earlier form specification found in Appendix J. The differences appear at lines fifteen, twenty-six, and thirty-seven. The import of line fifteen is that a default symbol map for the data label Address is a symbol map named Address_symbols. There might be other appropriate symbol maps with other names, and one of those could be specified in place of Address_symbols if that were desirable. The same general situation exists for the status map. At line thirty-seven the associated default map is identified to be one named Stat_map. There might well exist different status maps having different names. And at line twenty-six the existence of a default data map is denied. Absence of any such map means that data values are represented in the trace listing simply as their absolute values. (In the present example the base for such absolute values defaults to hexadecimal in the absence of any specification to the contrary.) Finally, note that these default map definitions in the format specification merely select which symbol maps to use if the default situation is actually achieved. Some particular symbol maps may be specified ("somewhere else"), in which case the default condition does not obtain. That "somewhere else" is in a trace specification, which is also now somewhat different than it was, as, say, in Appendix K.

Turning now to Appendix O, the modified trace specification is shown; it uses symbols to accomplish the same measurement as specified in Appendix K. It mentions no symbol maps, however, so the default choices of Appendix N are invoked. Also shown in Appendix O is another (entirely separate) sample trace specification that would produce an entirely separate measurement. It is included because it does mention a symbol map, which overrides the default choice specified for the given data label in the format specification. The point is that the actual invoking of a symbol map specification (whether explicitly or by default) occurs in the modified trace specification.

Now compare the resulting (but abbreviated) trace list appearing in Appendix P, pages i and ii, with the conventional trace list appearing in Appendix L. In particular, compare line +004 of Appendix L with line +004 of Appendix P. While in the former the disassembled instruction was rendered "JSM 806D", in the latter it appears as "JSM PARAMETER+0004." The "PARAMTER+0004" represents the relocatable location in the file named PARAMETER corresponding to the symbol "PARAMETER ENTRY" that appears in the source program for the parameter passing routine 5. In this case the map specification of Appendix M does not include the symbol PARAMETER_ENTRY, so all references to values within the range 8069H through 808EH are "demapped" to values relative to the start of that range. Both the absolute value 806DH and the symbol PARAMETER_ENTRY are the fourth location the that range.

Refer again to the map specification of Appendix M. Notice that the symbol FACTORIAL is defined as the absolute value 8013H, and that the symbol FACTOR is defined as the range 8013H through 8038H. Observe that FACTORIAL is thus a value within FACTOR. Now observe the "trigger" line on page i of Appendix P. The particular value defined as FACTORIAL is rendered as FACTORIAL rather than as a value relative to the start of the range FACTOR, as occurs in, say, lines +001 through +005.

Notice also on page i of Appendix P that at lines +066 and +077 occur demapped references to the range Z that lie on opposite sides of the reference location 42H. Line +075 illustrates a reference to STACK demapped relative to the end of its defined range of 0F9OFH through 0FA17H.

Now compare lines "trigger" through +005, +066, +075 and +077 of Appendix P to those same lines in Appendix L. It is abundantly clear that the trace listing of Appendix P is considerably easier to use. Notice further that a casual perusal of the conventional trace listing of Appendix L gives no sense of overall program flow; the instructions themselves have been disassembled, but the operands and address remain just so many numbers whose connection to the symbols of the source programming is obscure. The trace listing of Appendix P is in distinct contrast in that it is obvious that from lines +065 through +074 that the trace concerns program execution in the utility program BOOLEANIN 7, after which program execution transfers to a range labeled FACTOR, whose limits are known to correspond to the extent of the executable code for to the user written subprogram FACTOR 3.

The improved trace listing of Appendix P is possible, in part, through the agency of the map specification in Appendix M. However, that particular map specification, while providing a definite improvement, still required a modest amount of additional effort on the part of the user. That is, he still had to key in the names of the various symbols and their values. That is in contrast with the circumstances surrounding Appendix Q.

Referring again briefly to Appendix I, notice that one of the pieces of information concerning the listing output from the linker (i.e., the "load map") appears in line eighteen as "absolute & link_com file name=WORKPIECE:EXAMPL". What this means is that a related file specified as "WORKPIECE:EXAMPL:link_sym" includes, among other things, "range records" of named "user segments" and their associated start and end locations in memory. The names of the user segments are the same as the file names of the various program segments to be linked and loaded.

Returning now to Appendix Q, consider a command such as:

" . . . define link_sym film
    WORKPIECE:EXAMPL . . . "

This command would be issued by the user as part of the map specification and in lieu of keying in the names of the symbols and their ranges. The "... define ..." command itself is not shown as part of Appendix Q; what is shown is the result of issuing that command. That result is the "linked_files" information of lines twenty-five through thirty-four of Appendix Q. This makes some extra information part of the map specification compared to what was available in Appendix M. The extra information is that both start and end values for the range of a symbol are provided. By this means it will later be possible in the trace listing to indicate that an address or operand is outside any such range by the simple expedient of rendering it is an absolute value, while those that are within such a range are rendered as either a specific unique symbol or as relative to the particular symbol associated with that range.

Before examining the resulting trace list for this newest example, a somewhat different trace specification must also be considered. The user, at this point, would think of the trace specification in terms of the symbols INDEX and FACTORIAL. But the new map specification of Appendix Q does not explicitly show those symbols, although the information is implicity present. That is, the symbol INDEX is declared to be global in the file named MAIN:EXAMPL (see line forty-four of Appendix D) and the symbol FACTORIAL is declared to be a global function in the file named FACTOR:EXAMPL (see line fifty-five Appendix E). This implicit connection is made explicit by associating in the trace specification the file name MAIN:EXAMPL with the symbol INDEX and the file name FACTOR:EXAMPL with the symbol FACTORIAL. See lines two and four of Appendix R.

Now consider the resulting trace list, shown in pages i and ii of Appendix S. First, observe the by now familiar example of line +004. That line of the trace is now rendered as: "FACTOR+00002 JSM PARAMETER_ENTRY, PARAMETER ...." The difference between line +004 of Appendix S and line +004 of Appendix P is that the operand of the JSM instruction is now rendered as PARAMETER_ENTRY rather than as merely PARAMETER+0004. This is based on inspection of a file produced upon the assembly of PARAMETER:EXAMPL. (The actual complete specification of that file is PARAMETER:EXAMPL:asmb_sym. This reflects a "file name:user id:file type" convention employed by the Operating System used to manage files and run the compiler, assembler and linker, etc.) The ",PARAMETER" following the operand of the JSM refers to the complete file specification; it identifies the file used to produce the symbolic rendition of the JSM's operand. But since the display may be limited to eighty columns, and since the user can be expected to appreciate any such "name:user id:type" conventions, supplying only the name portion is a generally adequate compromise.

In a trace list such as in Appendices P and S the "direction of look up" is from the absolute value in hand (that came from the state analyzer) to the symbol (found in some file used by the linker). Owing to the more comprehensive nature of the information in the file WORKPIECE:EXAMPL that was incorporated into the map specification for the trace list of Appendix S, look up operations to find the absolute value of a symbol can be performed for all addresses and operands. See for example, line +006 in Appendix S. It is rendered as:

"... PARAMETER_ENTRY, STA DOPEVECTOR, PARAMETER ..."

rather than as merely:

"... PARAMETER+00004 STA PARAMETER+0000 ... ".

Once the ability to inspect source files for symbol names is at hand, as described in connection with Appendix S, it is also possible to include in the trace listing those original source program line numbers that produced the run time activity captured by the trace. In Appendix T, for example, we see that lines "trigger" through +004 are associated with line #8 of the source program. Such associations are limited to source lines that were compiled; assembled source lines are already in general one-to-one correspondence with the trace listing, owing to their word-by-word or byte-by-byte nature and the similarity of that nature to the executable object code.

Appendix T is the same trace listing as before with the addition of such source line numbers. For example, at line −002 of Appendix T we see the notation:

"... #18 MAIN00_L2,MAIN JSM ... "

What this means is that at line eighteen of some source programming in a file named MAIN the compiler generated a label MAIN00_L2 and emitted an executable instruction JSM, etc. The next executable instruction came from a source in a file named FACTOR, and so on.

Now consider Appendix U. Therein is a complete trace listing for the trace specification of the example used throughout this discussion. Not only are the line numbers included, but one copy of each associated source line is also included at the start of each block of different source line numbers.

Figure 2:
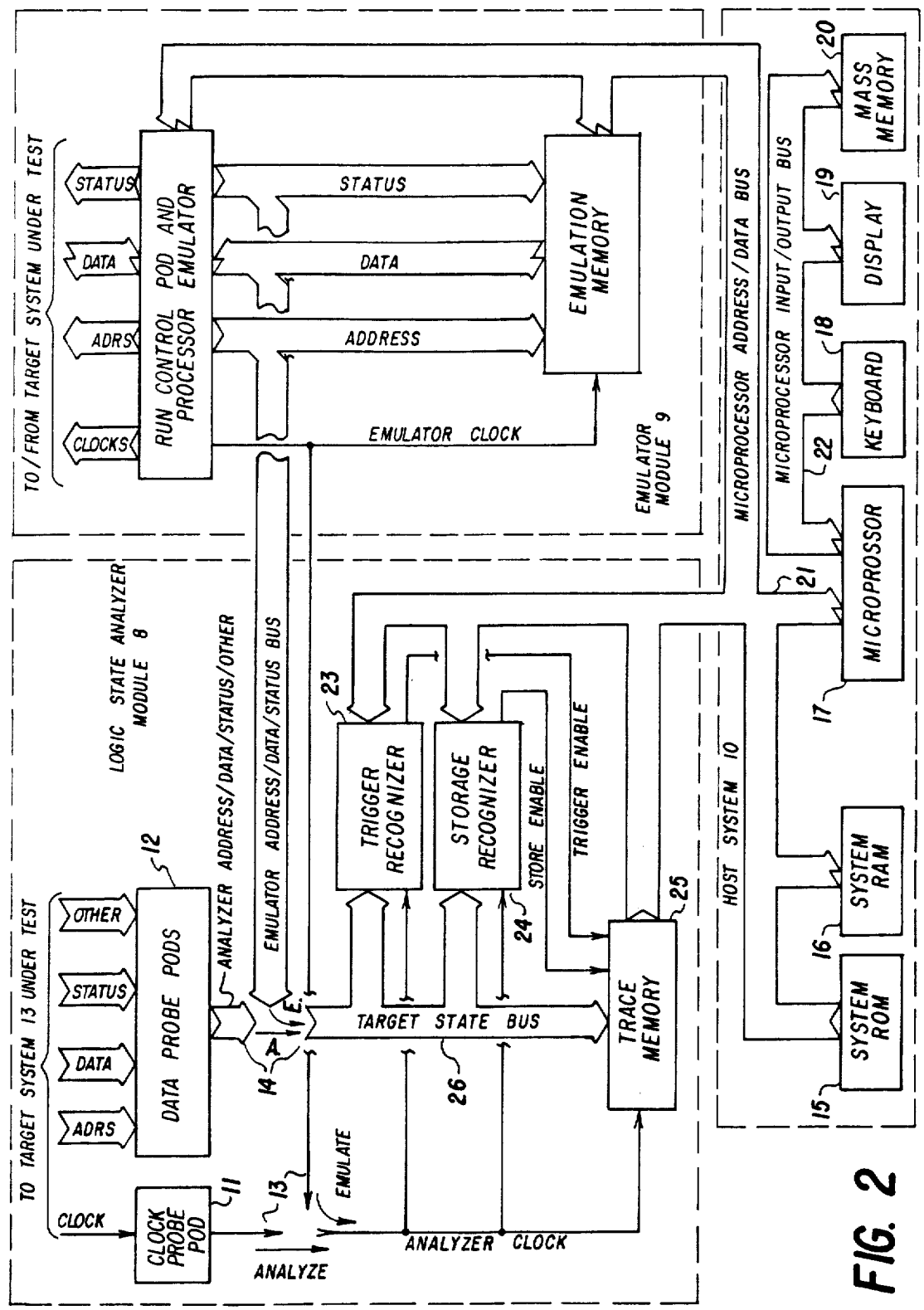
FIG. 2 is a simplified block diagram of a Logic State Analysis System capable of incorporating the principles of the invention.

Referring now to FIG. 2, shown there is a simplified block diagram of an environment within which the invention may be practiced. That environment may include either or both a Logic State Analyzer and an Emulator. As shown in FIG. 2 a Logic State Analyzer Module 8 and an Emulator Module 9 are installed into, cooperate with and are supported by a Host System 10. For example, the Host System 10 could be an HP 64000, the Logic State Analyzer Module 8 an HP 64620S, and the Emulator Mode 9 any of various HP 642XX used in conjunction with an HP 64304 Emulation Bus Preprocessor. The Emulation Bus Preprocessor corresponds generally to switching elements 13 and 14.

As shown in FIG. 2 the Logic State Analyzer Module 8 can receive data either from Probe Pods 11 and 12 connected to a Target System 13 under test or from the Emulator Module 9. The invention operates upon the data received by the Logic State Analyzer Module 8 in either case. To facilitate this the Logic State Analyzer Module 8 incorporates switching or multiplexing elements 13 and 14.

In a preferred embodiment the Host System 10 controls the operation of both the Emulator Module 9 (if it is present) and the Logic State Analyzer Module 8. To this end an Operating System including various suitable commands is encoded in a System Rom 15 and executed by a Microprocessor 17. This control would involve interaction with the user through a Keyboard 18 and a Display 19, and may involve such notions as "soft keys," "soft front panels," "directed syntax," etc. If a mass storage device 20 is present then command files to establish certain commonly used set-ups may be saved in labeled command files to be recalled and invoked at will. Likewise, the results of various measurements can be stored for later analysis and comparison.

The control of the Emulator and Logic Analyzer Modules 9 and 8 involves the preparation of a variety of tables of information, some of which are retained in an area of System RAM 16 and some of which are in distributed addressable locations in the Modules 8 and 9. These distributed locations are responsive to memory cycles upon a Microprocessor Address/Data Bus 21 initiated by the Microprocessor 17. By this means a Trigger Recognizer 23 and a Storage Recognizer 24 can be individually and selectively programmed by the user to accomplish their appropriate recognition tasks for a given measurement. Those tasks ultimately result in state data upon Target State Bus 26 being stored in a Trace Memory 25. This is the raw data of a trace listing that is to be formatted as described in any of Appendices P, S, T and V.

Such formatting is in part, accomplished in the preferred embodiment of FIG. 2 by various routines executed by the Operating System encoded in the System ROM 15 of the Host System 10. This involves inspection of various tables and files of information which may be variously found either in the System RAM 16 and the Mass Memory 20. Much of this needed information is generated, as previously described, by the user as he applies the various software tools to compile, assemble link and load the various programs and data structures that become the object of the trace listing. We now turn to just what that information is and how it is used to produce trace listings of the sort depicted in Appendices P, S, T and U.

Figure 3:
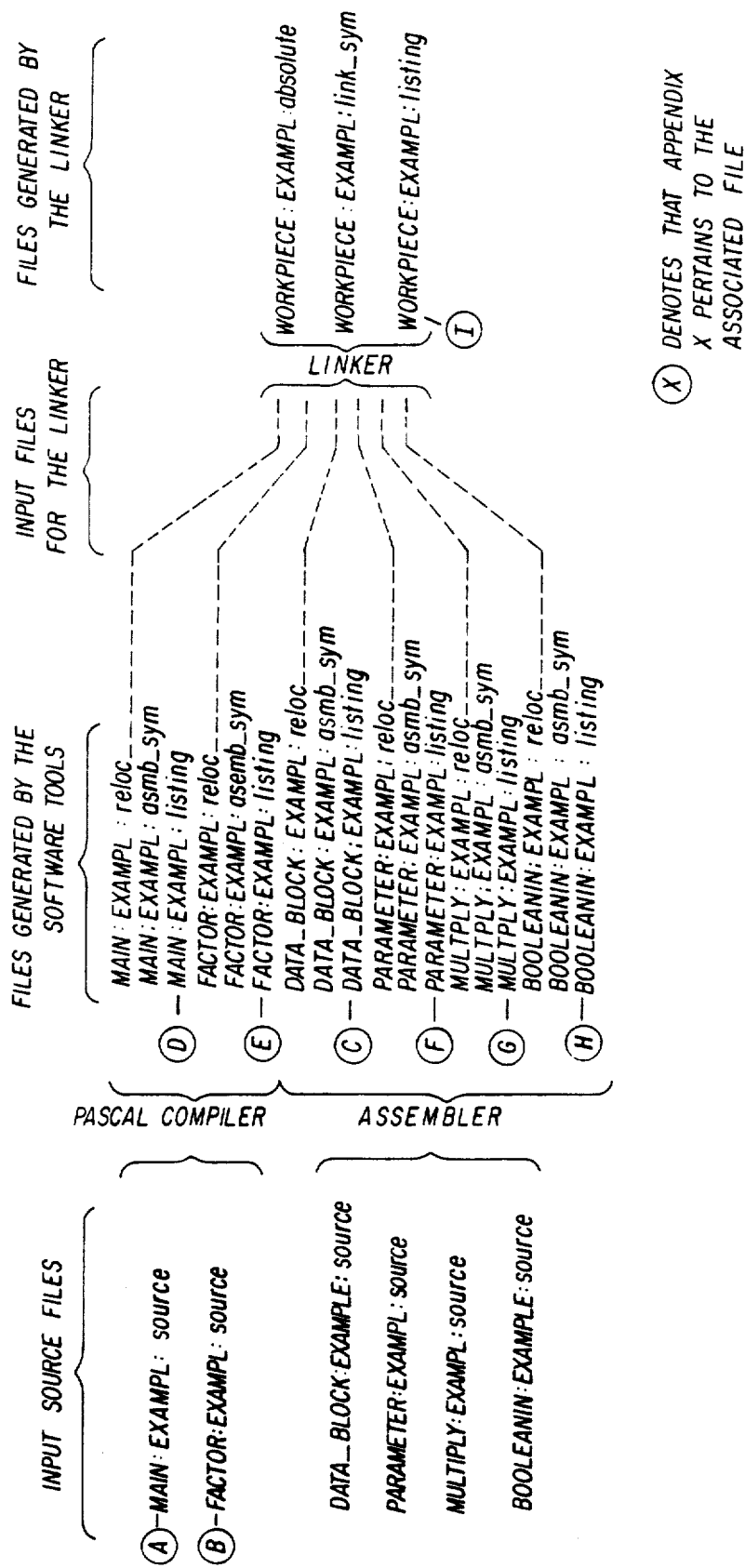
FIG. 3 is a diagram illustrating the relationship between various file names resulting from the application of the Analysis System of FIG. 2 to the workpiece programs of FIG. 1.

FIG. 3 is a schematic arrangement of various files of interest that are created in the course of generating, loading and executing the workpiece example program of FIG. 1. The Appendix section associated with certain of these files is also indicated. In view of all of the various explanations offered to this point it is believed that an extended explanation of FIG. 3 is not needed and that the Figure speaks for itself. It is a useful diagram, however, as it clearly sets forth the relationships between a multitude of files in which we are interested.

Figure 4:
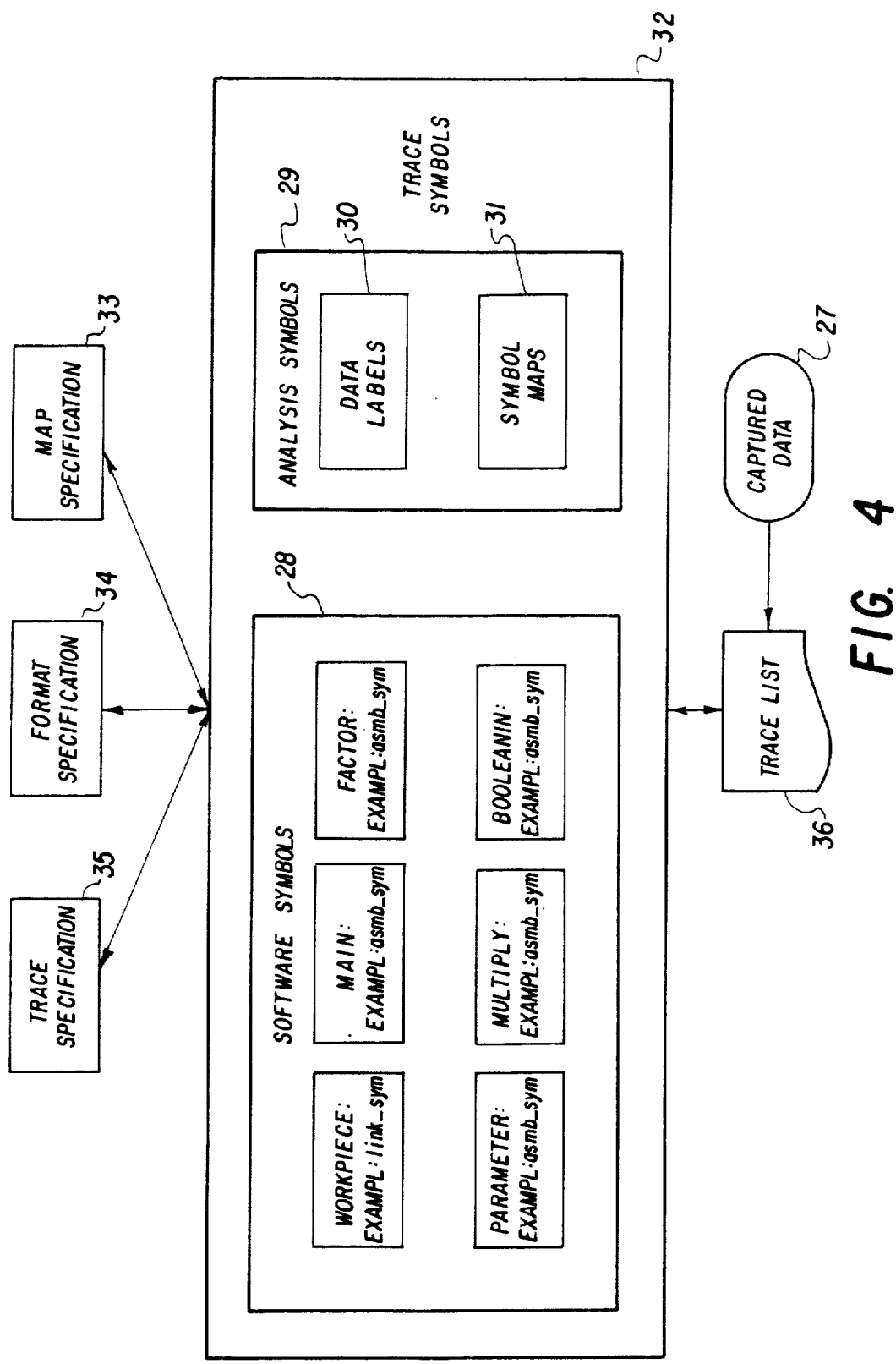
FIG. 4 is a diagram relating certain kinds of information about symbols defined either by the user during debugging or in the programs being traced to various Trace, Format and Map Specifications on the one hand and an unrelocated Trace List on the other.

FIG. 4 is a schematic arrangement of particular types of data that are of interest in the creation of the unrelocated listings of Appendices P, S, T and U, as well as the application of the associated trace, format and map specifications. Specifically the Captured Data 27 is what the Logic State Analyzer Module 8 would store in the Trace Memory 25. That is the raw information that is to be operated upon to make it as useful to and as easily interpreted by the user as possible.

That, in turn, is accomplished by properly interpreting certain Trace Symbols 32 which may be classed as either Software Symbols 28 or Analysis Symbols 29. The Software Symbols 28 are simply those symbols appearing in the various source programs, and that are "passed through" by compilation and assembly. Analysis Symbols 29 are those symbols someone operating the Logic State Analyzer Module will need to bring to the problem, over and above what is already defined in the programming. Examples are the Data Labels that are associated with particular target system signal lines of interest and that can experience various values. For example, three lines might be called Status, and might have various absolute values meaning read, write, instruction fetch, etc. The various Data Labels may be associated with maps wherein the different values are given symbolic names. In addition, the person conducting the analysis can include definitions of symbols of interest solely for the analysis of the particular programming whose execution is being traced, and that would have to be added to the source if they could not be added to the symbol maps. Adding them to the symbol maps saves having to edit, recompile, reassemble, and reload.

The Data Labels 30 are defined through the Format Specification 34, while the Symbol Maps 31 are defined through the Map Specification 33. Once those two specifications are made any symbol that is either a Software Symbol 28 or an Analysis Symbol 29 can be used in the Trace Specification 35, and may subsequently appear in the unrelocated Trace List 36. Hence, the union of the Software Symbols 28 and the Analysis Symbols 29 is referred to as Trace Symbols 32.

Figure 5:
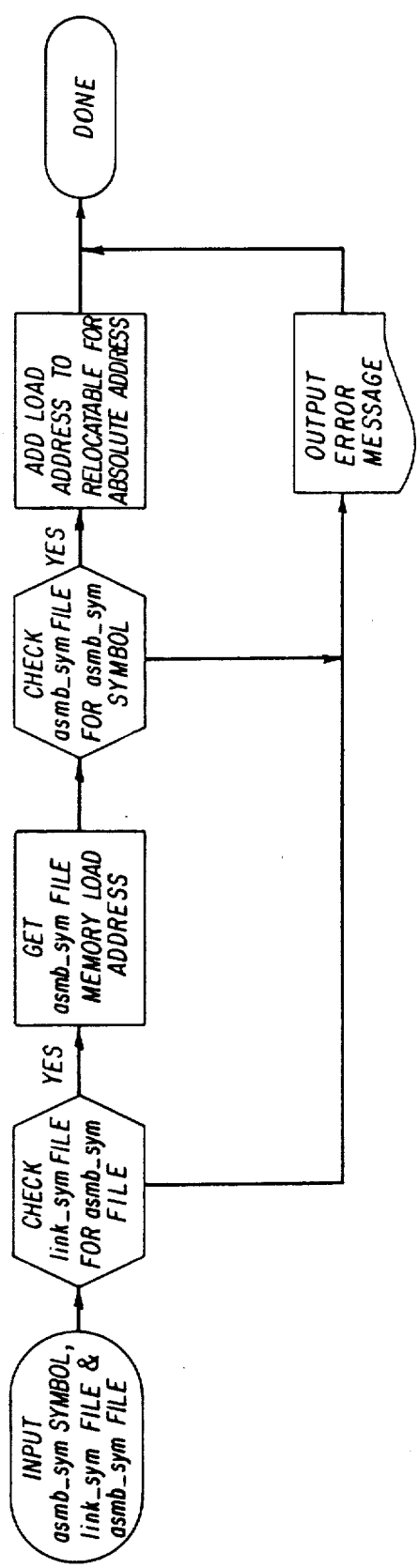
FIG. 5 is a flow chart describing the relationship in FIG. 4 between the Symbol Maps and the Trace Specification.

FIG. 5 is a flow chart of a process for replacing a Software Symbol 28 in a Trace Specification 35 with the corresponding absolute address. The flow chart is believed to be self-explanatory. Of course, Analysis Symbols 29 can be also be included in a Trace Specification 35, but their absolute values are obtained from inspection of an associated Symbol Map 31. A flow chart for that has been omitted.

Figure 6:
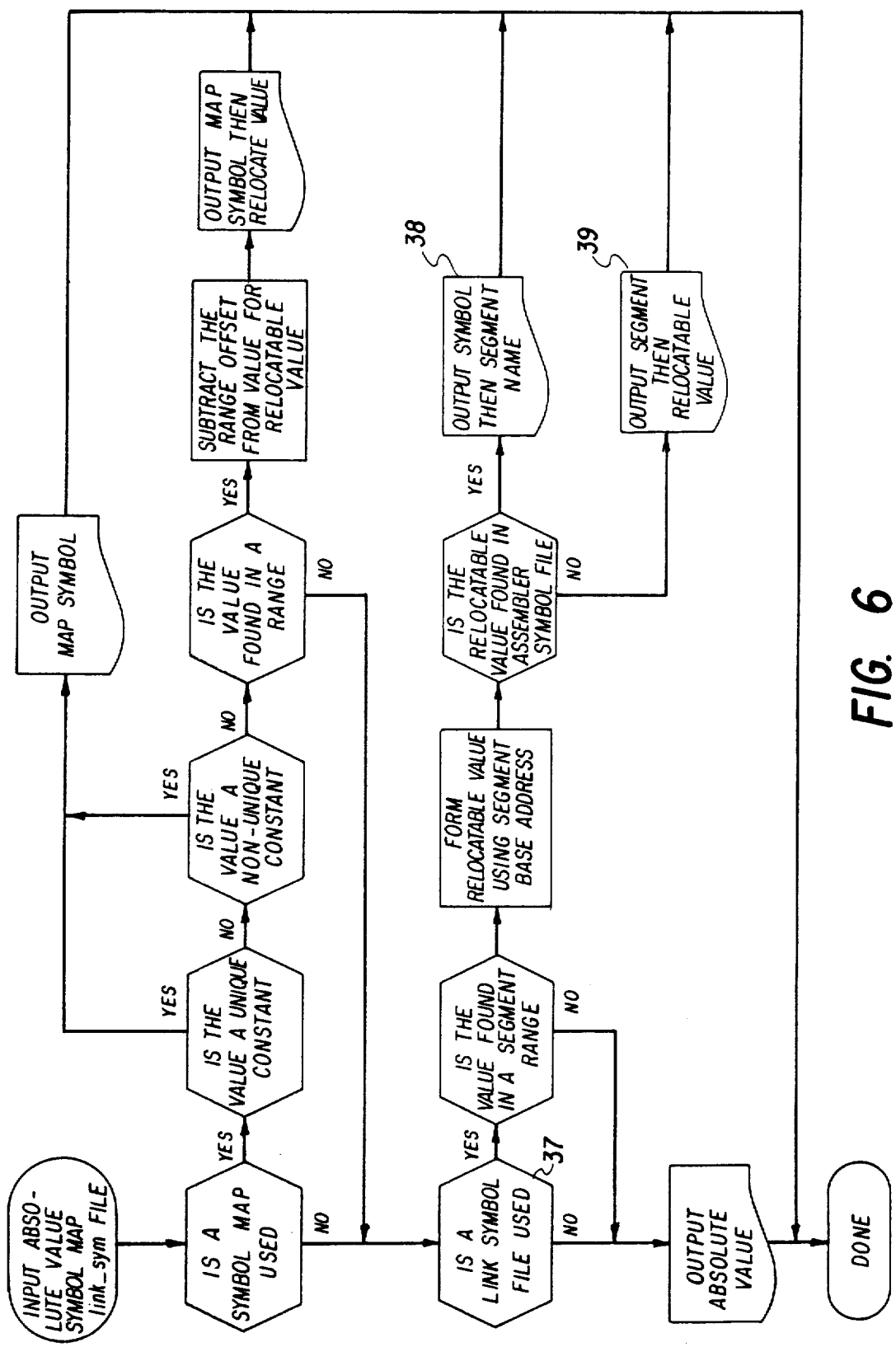
FIG. 6 is a flow chart describing the relationship in FIG. 4 between absolute values associated with the Trace List and the various Trace Symbols.

FIG. 6 is a flow chart of a process for removing an absolute value in a conventional trace list produced by a logic state analyzer and replacing that absolute value with a symbol in accordance with the various Trace Symbols of FIG. 4. The flow chart shows how and where to look for the various types of symbols that may be defined, as is believed to speak for itself. Note that if the user specifies a symbol in a Symbol Map whose associated absolute value has another symbol associated therewith from the collection of Software Symbols, the Analysis Symbol is the one used in the Trace List. The net effect of this is to allow the user to rename a Software Symbol during the debugging process without editing any source programs and without any recompiling, reassembling, and reloading.

The following remarks apply to trace lists including source line numbers and source lines, such as appearing in Appendices T and U, respectively. Line numbers are generated by the compiler and appear in the :asmb__sym file. A line appears in the listing as if it were a symbol, generally in its own column, and maybe extracted by an algorithm similar to that of the flow chart in FIG. 6. In particular, a minor change in connection with the "yes" path through decision 32 requires that processes 38 and 39 be adjusted to provide line numbers when required. And in the case where source lines themselves are also desired, process 30 also supplies the source line.

The following remarks apply to instances where the invention is used in conjunction with Target Systems incorporating a Memory Management Unit (MMU). In such a system the MMU intercepts the memory bus between the processor and the memory. If the logic analyzer's address probes are connected to the virtual address existing between the processor and the MMU then no special considerations are required; the presence of the MMU is not discernable.

However, some special actions are generally required in the case where the address probes are connected to the physical address existing between the MMU and the memory. First, the MMU generally will adjust the address of memory cycles according to an amount determined or selected by the Operating System. That amount might be the contents of some addressable register. The logic analyzer would need to monitor any write operations to that register to learn the instructions being passed to the MMU. Second, there is an alteration in the relationship of FIG. 4 for the mapping between the absolute values of the raw trace information and the available Trace Symbols and the mapping in the other direction between the symbols used in the various Trace, Format and Map Specifications and their associated absolute values. In the case of the first mappings mentioned above an associated presubtraction is applied to the physical address, which is then used as before. The value that is subtracted is associated with the instructions sent to the MMU and that are monitored by the Logic Analyzer. In the case of the mappings in the other direction a post-addition is applied to the resulting absolute value to produce the actual physical memory location. As before, the amount added would correspond to previous instructions supplied to the MMU and monitored by the Logic Analyzer.

Another way to use the invention pertains to circumstances where a file in the Mass Memory 20 of FIG. 2 contains an image of a trace that might have at one time been in the Trace Memory 25. Such a file of a trace need not have even originated with the Logic State Analyzer Module 8; the data therein may have been gathered under entirely different circumstances and arrived at the Mass Memory 20 by any of a number of convenient means, including a removable recording medium and transmission over suitable data links. Once in the Mass Memory 20, such a file may be operated upon by the invention as if it actually came from the Trace Memory 25.

TABLE I

| APPENDIX | Index to the Appendices DESCRIPTION |
|---|---|
| A | MAIN source |
| B | FACTOR Source |
| C | DATA_BLOCK assembly listing |
| D | MAIN expanded compiler listing |
| E | FACTOR expanded compiler listing |
| F | PARAMETER assembly listing |
| G | MULTIPLY assembly listing |
| H | BOOLEANIN assembly listing |
| I | Linker Load Map |
| J | Format Specification |
| K | Conventional Trace Specification |
| L | Conventional Trace List |
| M | Map Specification |
| N | Format Specification with Default map |
| O | Trace Specification with Analysis Symbols |
| P | Trace List with Analysis Symbols |
| Q | Map Specification with Software Symbols |
| R | Trace Specification with Trace Symbols |
| S | Trace List with Trace Symbols |
| T | Trace List with source line numbers and Trace Symbols |
| U | Full Trace List with source lines and Trace Symbols |

******** PAGE 1 OF APPENDIX A ********

```
 1    "BPC"
 2    PROGRAM MAIN;
 3
 4    VAR
 5       $GLOBVAR+$
 6          INDEX:INTEGER;
 7       $GLOBVAR-$
 8
 9       $EXTVAR+$
10          DATA_BLOCK : ARRAY[0..20] OF INTEGER;
11       $EXTVAR-$
12
13    FUNCTION FACTORIAL(I:INTEGER):INTEGER;EXTERNAL;
14
15    BEGIN
16       FOR INDEX := 0 TO 20 DO
17          BEGIN
18             DATA_BLOCK[INDEX] := FACTORIAL(INDEX);
19          END;
20    END.
```

******** PAGE 1 OF APPENDIX B ********

```
 1    "BPC"
 2    $GLOBPROC+$
 3    PROGRAM FACTOR;
 4       TYPE
 5          SOI = SET OF 0..15;
 6       FUNCTION FACTORIAL(NUMBER:INTEGER):INTEGER;
 7          VAR I,SUM : INTEGER;
 8          BEGIN
 9             SUM := 1;
```

```
10          IF NOT (NUMBER IN [0,1]) THEN
11            FOR I := 2 TO NUMBER DO
12              SUM := SUM * I;
13          FACTORIAL := SUM;
14        END;
15    .
```

******** PAGE 1 OF APPENDIX C ********

LOCATION OBJECT LINE     SOURCE LINE

```
         1 "BPC"
         2 ************** *heading on* **********************************
         3 * name             : DATA_BLOC:EXAMPL:assembly
         4 * author           : Bryce Goodwin
         5 ***************************************************************
         6 * calling sequence : none
         7 ***************************************************************
         8 * description
         9 *     This is a global data structure that will be used by
        10 *     many procedures.
        11 ***************************************************************
        12 * global routines              : none
        13 * global variables
        14                GLB DATA_BLOCK        ; array [0..20] of integer
        15 * global constants             : none
        16 * external variables  : none
        17 * external routines   : none
        18 ************** *heading off* **********************************
        19 * local constants     : none
        20 * local variables
0000    21 DATA_BLOCK    BSS 21         ARRAY [0..20]
        22 ***************************************************************
```

******** PAGE 1 OF APPENDIX D ********

LOCATION OBJECT LINE     SOURCE LINE

```
              1 "BPC"
              2 *  1 0000  1  "BPC"
              3 *  2 0000  1  PROGRAM MAIN;
              4 *  3 0000  1
              5 *  4 0000  1  VAR
              6 *  5 0000  1    $GLOBVAR+$
              7 *  6 0000  1      INDEX:INTEGER;
              8 *  7 0001  1    $GLOBVAR-$
              9 *  8 0001  1
             10 *  9 0001  1    $EXTVAR+$
             11 * 10 0001  1      DATA_BLOCK : ARRAY[0..20] OF INTEGER;
             12                   EXT DATA_BLOCK
             13 * 11 0001  1    $EXTVAR-$
             14 * 12 0001  1
             15 * 13 0001  1  FUNCTION FACTORIAL(I:INTEGER):INTEGER;EXTERNAL;
             16                EXT FACTORIAL
             17 * 14 0000  1
             18 * 15 0000  1  BEGIN
             19                PROG
             20 * 16 0000  1    FOR INDEX := 0 TO 20 DO
0000 0000    21 MAIN           LDA Z+21
0001 340E    22                STA MAIN00_D
```

```
0002 0000      23                  LDA Z
0003 340D      24                  STA INDEX
               25 *  17 0004  1      BEGIN
               26 *  18 0004  1         DATA_BLOCK[INDEX] := FACTORIAL(INDEX);
0004 4000      27 MAIN00_L2        JSM FACTORIAL
0005 0010      28                  DEF INDEX
0006 0C0A      29                  LDB INDEX
0007 2C07      30                  ADB MAIN00_C
0008 B001      31                  STA B,I
               32 *  19 0009  1      END;
0009 4C07      33                  ISZ INDEX
000A 0000      34                  NOP
000B 5C04      35                  DSZ MAIN00_D
000C 6FF8      36                  JMP MAIN00_L2
               37 *  20 000D  1   END.
000D F081      38 MAIN00_L1        RET 1
               39
000E 0000      40 MAIN00_C         DEF DATA_BLOCK
000F           41 MAIN00_D         BSS 1
0010           42 INDEX            BSS 1
               43                  GLB MAIN
               44                  GLB INDEX
               45                  EXT Z
  <0000>       46                  END MAIN
```

******** PAGE 1 OF APPENDIX E ********

```
LOCATION OBJECT LINE     SOURCE LINE

1  "BPC"
                2 *  1 0000  1   "BPC"
                3 *  2 0000  1   $GLOBPROC+$
                4 *  3 0000  1   PROGRAM FACTOR;
                5 *  4 0000  1    TYPE
                6 *  5 0000  1       SOI = SET OF 0..15;
                7 *  6 0000  1    FUNCTION FACTORIAL(NUMBER:INTEGER):INTEGER;
                8 *  7 0000  2      VAR I,SUM : INTEGER;
                9 *  8 0004  2      BEGIN
               10                   PROG
0000 041D      11 FACTORIAL         LDA FACTORI01_C
0001 0C1D      12                   LDB FACTORI01_C+1
               13                   EXT PARAMETER_ENTRY
0002 4000      14                   JSM PARAMETER_ENTRY
               15 *  9 0003  2        SUM := 1;
0003 0000      16                   LDA Z+1
0004 3420      17                   STA FACTORI01_D+3
               18 * 10 0005  2        IF NOT (NUMBER IN [0,1]) THEN
0005 0C1C      19                   LDB FACTORI01_D
0006 0000      20                   LDA Z+3
               21                   EXT BOOLEANIN_ENTRY
0007 4000      22                   JSM BOOLEANIN_ENTRY
0008 7712      23                   RLA FACTORI01_L1
               24 * 11 000A  2          FOR I := 2 TO NUMBER DO
0009 0000      25                   LDA Z+2
000A F020      26                   TCA
000B 2416      27                   ADA FACTORI01_D
000C 4800      28                   ISZ A
000D F402      29                   SAP $+2
000E 6C0C      30                   JMP FACTORI01_L1
000F 3416      31                   STA FACTORI01_D+4
0010 0000      32                   LDA Z+2
```

```
0011 3412    33                STA FACTORI01_D+2
             34 *  12 0013  2        SUM := SUM * I;
0012 0412    35 FACTORI01_L2   LDA FACTORI01_D+3
0013 0C10    36                LDB FACTORI01_D+2
             37                EXT MULTIPLY_ENTRY
0014 4000    38                JSM MULTIPLY_ENTRY
0015 340F    39                STA FACTORI01_D+3
0016 4C0D    40                ISZ FACTORI01_D+2
0017 0000    41                   NOP
0018 5C0D    42                DSZ FACTORI01_D+4
0019 6FF9    43                   JMP FACTORI01_L2
             44 *  13 001B  2        FACTORIAL := SUM;
001A 040A    45 FACTORI01_L1   LDA FACTORI01_D+3
001B 3407    46                STA FACTORI01_D+1
             47 *  14 001D  2        END;
001C F081    48                RET 1
001D 001F    49 FACTORI01_C    DEF FACTORI01_E
001E 0021    50                DEF FACTORI01_D
001F 0001    51 FACTORI01_E    DEC 1
0020 0002    52                DEC 2
0021 0000    53 FACTORI01_D    BSSZ 5
             54 *  15 0000  1  .
             55                GLB FACTORIAL
             56                EXT Z
```

******* PAGE 1 OF APPENDIX F *******

LOCATION OBJECT LINE    SOURCE LINE

```
 1  "BPC"
 2  *************** *heading on* *********************************
 3  * name              : PARAMETER:EXAMPL:assembly
 4  * author            : Bryce Goodwin
 5  ****************************************************************
 6  * calling sequence
 7  *          LDA dopevector     *i.e. PROC_C
 8  *          LDB to-address     *i.e. PROC_D
 9  *          JSM PARAMETER_ENTRY
10  ****************************************************************
11  * description
12  *     This routine is the parameter passing routine that is
13  *     used by BPC pascal to pass parameters between any two
14  *     procedures.
15  *
16  * DOPE VECTOR FORMAT:
17  *     ------------------------------------
18  *     |  NO. OF PARAMETERS  (n)          |
19  *     ------------------------------------
20  *     |  SIZE OF PAR. # 1 (IN BYTES)     |
21  *     ------------------------------------
22  *     |              :                   |
23  *     |              .                   |
24  *     ------------------------------------
25  *     |  SIZE OF PAR. # n (IN BYTES)     |
26  *     ------------------------------------
27  *
28  * NOTE: Positive numbers indicate constant parameters
29  *          i.e. CALL-BY-VALUE
30  *       Negative numbers indicate variable parameters
31  *          i.e. CALL-BY-REFERENCE
32  *       (a var parameter will result in a -2 since the
```

```
 33 *            2-byte address is always passed)
 34 *
 35 ************************************************************
 36 * global routines
 37              GLB PARAMETER_ENTRY
 38 * global variables   : none
 39 * external variables : none
 40 * external routines  : none
 41 ************* *heading off* ******************************
 42 * local constants    : none
 43 * local variables
```

| LOCATION | OBJECT | LINE |          |          |                              |
|----------|--------|------|----------|----------|------------------------------|
| 0000     | 0000   | 44   | DOPEVECTOR       | DEC 0            | ADDRESS OF DOPE VECTOR.         |
| 0001     | 0000   | 45   | COUNT            | DEC 0            | NUMBER OF PARAMTERS.            |
| 0002     | 0000   | 46   | SIZE             | DEC 0            | SIZE OF VALUE PARAMETER.        |
| 0003     | 0000   | 47   | PROCEDURE_ENTRY  | DEC 0            | SAVE R REGISTER                 |
|          |        | 48   | *********************************************************** |
| 0004     | 37FC   | 49   | PARAMETER_ENTRY  | STA DOPEVECTOR   | SAVE DOPEVECTOR ADDR            |
| 0005     | 5801   | 50   |                  | DSZ B            | PLACE BEFORE                    |
| 0006     | 380F   | 51   |                  | STB D            | (D)= PARAM ADDR-1               |
| 0007     | 8803   | 52   |                  | LDB R,I          | STACK POINTER IS CALLING ADDR   |
| 0008     | 7D41   | 53   |                  | SIB $+1          | POINT TO THE RETURN ADDR        |
| 0009     | 3FFA   | 54   |                  | STB PROCEDURE_ENTRY | AND SAVE                     |
| 000A     | 5803   | 55   |                  | DSZ R            | POINT TO THE LAST STACK ADDR    |
| 000B     | 8803   | 56   |                  | LDB R,I          | GET THE ROUTINES CALLING ADDR   |
| 000C     | 7D41   | 57   |                  | SIB $+1          | PARAM ADDR IS CALLING ADDR      |
| 000D     | 380E   | 58   |                  | STB C            | PARAM ADDR TO SOURCE STACK      |
| 000E     | 8800   | 59   |                  | LDB A,I          | FETCH THE NUMBER OF PARAMS      |
| 000F     | 3FF2   | 60   |                  | STB COUNT        | SAVE PARAM COUNT                |
| 0010     | A803   | 61   |                  | ADB R,I          | NUMBER OF PARAMS+CALLING ADDR   |
| 0011     | B803   | 62   |                  | STB R,I          | RETURN ADDR - 1                 |
|          |        | 63   |                  |                  |                                 |
| 0012     | 4FEE   | 64   | LOOP             | ISZ DOPEVECTOR   | UPDATE DOPEVECTOR ADDR          |
| 0013     | 7170   | 65   |                  | WWC A,I          | GET PARAM ADDRESS               |
| 0014     | 7404   | 66   |                  | RZA DIRECT       | ZERO MEANS INDIRECT             |
| 0015     | 7170   | 67   |                  | WWC A,I          | GET ADDR OF ADDR                |
| 0016     | 8000   | 68   |                  | LDA A,I          | GET ADDR                        |
| 0017     | C803   | 69   |                  | ISZ R,I          | ADJUST RETURN ADDR FOR DEF 0    |
| 0018     | 8FE8   | 70   | DIRECT           | LDB DOPEVECTOR,I | GET PARAM INFORMATION           |
| 0019     | FD09   | 71   |                  | SBM VAR          | IF NEG VALUE THEN VAR PARAM     |
| 001A     | F940   | 72   |                  | SBR 1            | CONVERT BYTES TO WORDS          |
| 001B     | 3FE7   | 73   |                  | STB SIZE         | NUMBER OF VALUE WORDS TO MOVE   |
|          |        | 74   |                  |                  |                                 |
| 001C     | 8800   | 75   | VALOOP           | LDB A,I          | FETCH VALUE WORD                |
| 001D     | 7169   | 76   |                  | PWD B,I          | STORE VALUE IN PARAM AREA       |
| 001E     | 7541   | 77   |                  | SIA $+1          | INCREMENT VALUE WORD ADDR       |
| 001F     | 5FE3   | 78   |                  | DSZ SIZE         | ANYMORE VALUE WORDS?            |
| 0020     | 6FFC   | 79   |                  | JMP VALOOP       | YES, GET NEXT VALUE WORD        |
|          |        | 80   |                  |                  |                                 |
| 0021     | 6C02   | 81   |                  | JMP DONE         |                                 |
| 0022     | 7168   | 82   | VAR              | PWD A,I          | STORE VAR PARAMETER ADDR        |
| 0023     | 5FDE   | 83   | DONE             | DSZ COUNT        | ANYMORE PARAMS?                 |
| 0024     | 6FEE   | 84   |                  | JMP LOOP         | YES, GET NEXT PARAM             |
|          |        | 85   |                  |                  |                                 |
| 0025     | EFDE   | 86   |                  | JMP PROCEDURE_ENTRY,I |                            |

******** PAGE 1 OF APPENDIX G ********

| LOCATION OBJECT LINE | SOURCE LINE |
|---|---|
| 1 | "BPC" |
| 2 | ************* *heading on* ******************************** |
| 3 | * name               : MULTIPLY:EXAMPL:assembly |

```
10 ****************************************************************
11 * description
12 *       Check for VALUE bit in the SET WORD and 0<=VALUE<=15
13 ****************************************************************
14 * global routines
15                    GLB BOOLEANIN_ENTRY
16 * global variables           : none
17 * global constants
18                    GLB B0
19                    GLB Z
20 * external variables : none
21 * external routines  : none
22 ************* *heading off* *********************************
23 * local constants
           <0042>     24 Z              EQU 42H      ; CONSTANT 0 IN ROM
0000 0001  25 B0              BIN 0000000000000001
0001 0002  26 B1              BIN 0000000000000010
0002 0004  27 B2              BIN 0000000000000100
0003 0008  28 B3              BIN 0000000000001000
0004 0010  29 B4              BIN 0000000000010000
0005 0020  30 B5              BIN 0000000000100000
0006 0040  31 B6              BIN 0000000001000000
0007 0080  32 B7              BIN 0000000010000000
0008 0100  33 B8              BIN 0000000100000000
0009 0200  34 B9              BIN 0000001000000000
000A 0400  35 B10             BIN 0000010000000000
000B 0800  36 B11             BIN 0000100000000000
000C 1000  37 B12             BIN 0001000000000000
000D 2000  38 B13             BIN 0010000000000000
000E 4000  39 B14             BIN 0100000000000000
000F 8000  40 B15             BIN 1000000000000000
0010 0010  41 DEFB0           DEF B0+16
           42 * local variables     : none
           43 ****************************************************************
0011 FD08  44 BOOLEANIN_ENTRY SBM FALSE      VALID VALUES ARE 0..15
0012 2832  45                 ADB Z-16       VALID VALUES ARE 0..15
0013 FC06  46                 SBP FALSE
0014 2FFC  47                 ADB DEFB0      VALID VALUE SO CHECK BIT
0015 D001  48                 AND B,I
0016 7504  49                 SZA DONE
0017 0043  50                 LDA Z+1
0018 6C02  51                 JMP DONE
0019 0042  53 FALSE           LDA Z
001A F081  53 DONE            RET 1
```

******** PAGE 1 OF APPENDIX I ********

| | FILE/PROG NAME | PROGRAM |
|---|---|---|
| 1 | | |
| 2 | ——————————————————— | |
| 3 | MAIN:EXAMPL | 8002 |
| 4 | FACTOR:EXAMPL | 8013 |
| 5 | DATA_BLOC:EXAMPL | 8039 |
| 6 | next address | 804E |
| 7 | | |
| 8 | | |
| 9 | Libraries | |
| 10 | BOOLEANIN:EXAMPL | 804E |
| 11 | PARAMETER:EXAMPL | 8069 |
| 12 | MULTIPLY:EXAMPL | 808F |
| 13 | next address | 80A8 |
| 14 | | |

```
                      4  * author          : Bryce Goodwin
                      5  ****************************************************************
                      6  * calling sequence
                      7  *              LDA FACTOR1
                      8  *              LDB FACTOR2
                      9  *              JSM MULTIPLY_ENTRY
                     10  ****************************************************************
                     11  * description
                     12  *     Multiply FACTOR1 by FACTOR2 and place the result in the
                     13  *     A reg. Both FACTOR'S are masked to be 8 bit numbers.
                     14  ****************************************************************
                     15  * global routines
                     16                GLB MULTIPLY_ENTRY
                     17  * global variables       : none
                     18  * global constants       : none
                     19  * external variables    : none
                     20                EXT Z
                     21  * external routines     : none
                     22  ************* *heading off* ************************************
                     23  * local constants
0000 00FF            24  ML8           HEX 00FF
                     25  * local variables
0001                 26  LOOP_COUNT    BSS 1
0002                 27  FACTOR1       BSS 1
0003                 28  PRODUCT       BSS 1
                     29  ****************************************************************
0004 57FC            30  MULTIPLY_ENTRY AND ML8      MASK FACTOR 1 TO 8 BITS
0005 37FD            31                STA FACTOR1
0006 0000            32                LDA Z+8       INITIALIZE FOR B BIT MULTIPLY
0007 37FA            33                STA LOOP_COUNT
0008 0000            34                LDA Z         CLEAR THE PRODUCT
0009 37FA            35                STA PRODUCT
000A 07F8            36                LDA FACTOR1
000B F987            37                SBL 8         MASK FACTOR 2 TO
000C F947            38                SBR 8           8 BITS
000D 7E05            39  MULT_LOOP     SLB NOADD     IF MULTIPLIER LSB IS ONE
000E 37F4            40                STA FACTOR1   THEN SAVE THE CURRENT FACTOR
000F 27F4            41                ADA PRODUCT   ADD THE FACTOR TO THE PRODUCT
0010 37F3            42                STA PRODUCT   SAVE THE PRODUCT
0011 07F1            43                LDA FACTOR1   RESTORE THE FACTOR
0012 F940            44  NOADD         SBR 1         SHIFT MULTIPLIER
0013 7D04            45                SZB DONE      IF MULTIPLIER IS ZERO, DONE
0014 F180            46                SAL 1         MULTIPLY THE FACTOR BY 2
0015 5FEC            47                DSZ LOOP_COUNT IF LOOP_COUNT <> 0
0016 6FF7            48                JMP MULT_LOOP   THEN LOOP AGAIN
0017 07EC            49  DONE          LDA PRODUCT   THE RETURN VALUE
0018 F081            50                RET 1
```

LOCATION OBJECT LINE    SOURCE LINE

```
                      1  "BPC"
                      2  ************** *heading on* *************************************
                      3  * name           : BOOLEANIN:EXAMPL:assembly
                      4  * author         : Bryce Goodwin
                      5  ****************************************************************
                      6  * calling sequence
                      7  *              LDA SET_WORD ; SET OF BITS
                      8  *              LDB VALUE    ; BIT NUMBER
                      9  *              JSM BOOLEANIN_ENTRY
```

```
15
16    XFER address= 8002       Defined by MAIN:EXAMPL
17    No. of passes through libraries=   1
18    absolute & link_com file name=WORKPIECE:EXAMPL
19    Total# of words loaded= 00A6
```

******** PAGE 1 OF APPENDIX J ********

```
**************************************************************
****************** FORMAT SPECIFICATION ******************
**************************************************************

Clock
1
2       Threshold:    <       ttl      ><        ttl        >
3       Channel:       7   6   5    4    3    2    1    0
4                                                        +
5
6
7                                Pod 2         Pod 1 ranging
8       ___data_label___  <      ttl      > <      ttl       >
9                         9876543210987654321 09876543210987654321 0
10      Address                                 PPPPPPPPPPPPPPPP
11
12         Location:        pod_1_bit 0 thru pod_1_bit 15
13         Width:           16 bits
14         Logic polarity:  positive
15                          ranging label
16
17                               Pod 2         Pod 1 ranging
18      ___data_label___  <      ttl      > <      ttl       >
19                        9876543210987654321 09876543210987654321 0
20      Data              PPPPPPPPPPPPPPPP
21
22         Location:        pod_2_bit 0 thru pod_2_bit 15
23         Width:           16 bits
24         Logic polarity:  positive
25
26
27                               Pod 2         Pod 1 ranging
28      ___data_label___  <      ttl      > <      ttl       >
29                        9876543210987654321 09876543210987654321 0
30      Status                                           PPP
31
32         Location:        pod_1_bit 16 thru pod_1_bit 18
33         Width:           3 bits
34         Logic polarity:  positive
```

******** PAGE 1 OF APPENDIX K ********

```
**************************************************************
****************** TRACE SPECIFICATION ******************
**************************************************************

1       TRIGGER
2           enable_after Address = 8012H and Status = 0 and Data = 3
3           on Address = 8013H and Status = 7
4           position_is 3 states_after_start
5
```

```
6    STORE
7        on any_state
8
9    COUNT
10       on time
```

******* PAGE 1 OF APPENDIX L *******

| Label:<br>Base: | Address<br>hex | BPC opcode<br>hex | Status<br>hex |
|---|---|---|---|
| -002 | 08006 | JSM 8013 | 07 |
| -001 | 0F9F7 | 8006 write | 00 |
| trigger | 08013 | LDA 8030 | 07 |
| +001 | 08030 | 8032 read | 01 |
| +002 | 08014 | LDB 8031 | 07 |
| +003 | 08031 | 8034 read | 01 |
| +004 | 08015 | JSM 806D | 07 |
| +005 | 0F9F8 | 8015 write | 00 |
| +006 | 0806D | STA 8069 | 07 |
| +007 | 08069 | 8032 write | 00 |

. TRACE STATES 8 TO 52 ELIMINATED

| +053 | 0808E | JMP 806C,I | 07 |
| +054 | 0806C | 8016 read | 01 |
| +055 | 08016 | LDA 0043 | 07 |
| +056 | 00043 | 0001 read | 01 |
| +057 | 08017 | STA 8037 | 07 |
| +058 | 08037 | 0001 write | 00 |
| +059 | 08018 | LDB 8034 | 07 |
| +060 | 08034 | 0003 read | 01 |
| +061 | 08019 | LDA 0045 | 07 |
| +062 | 00045 | 0003 read | 01 |
| +063 | 0801A | JSM 805F | 07 |
| +064 | 0F9F8 | 801A write | 00 |
| +065 | 0805F | SBM 8067 | 07 |
| +066 | 08060 | ADB 0032 | 07 |
| +067 | 00032 | FFF0 read | 01 |
| +068 | 08061 | SBP 8067 | 07 |
| +069 | 08062 | ADB 805E | 07 |
| +070 | 0805E | 805E read | 01 |
| +071 | 08063 | AND B,I | 07 |
| +072 | 08051 | 0008 read | 01 |
| +073 | 08064 | SZA 8068 | 07 |
| +074 | 08068 | RET 1 | 07 |
| +075 | 0F9F8 | 801A read | 01 |
| +076 | 0801B | RLA 802D | 07 |
| +077 | 0801C | LDA 0044 | 07 |
| +078 | 00044 | 0002 read | 01 |
| +079 | 0801D | TCA | 07 |
| +080 | 0801E | ADA 8034 | 07 |
| +081 | 08034 | 0003 read | 01 |
| +082 | 0801F | ISZ A | 07 |
| +083 | 08020 | SAP 8022 | 07 |
| +084 | 08022 | STA 8038 | 07 |
| +085 | 08038 | 0002 write | 00 |
| +086 | 08023 | LDA 0044 | 07 |
| +087 | 00044 | 0002 read | 01 |
| +088 | 08024 | STA 8036 | 07 |
| +089 | 08036 | 0002 write | 00 |

| | | | |
|---|---|---|---|
| +090 | 08025 | LDA 8037 | 07 |
| +091 | 08037 | 0001  read | 01 |
| +092 | 08026 | LDB 8036 | 07 |
| +093 | 08036 | 0002  read | 01 |
| +094 | 08027 | JSM 8093 | 07 |
| +095 | 0F9F8 | 8027  write | 00 |
| +096 | 08093 | AND 808F | 07 |
| +097 | 0808F | 00FF  read | 01 |

. 
. TRACE STATES 98 TO 130 ELIMINATED
.

| | | | |
|---|---|---|---|
| +131 | 080A6 | LDA 8092 | 07 |
| +132 | 08092 | 0002  read | 01 |
| +133 | 080A7 | RET 1 | 07 |
| +134 | 0F9F8 | 8027  read | 01 |
| +135 | 08028 | STA 8037 | 07 |
| +136 | 08037 | 0002  write | 00 |
| +137 | 08029 | ISZ 8036 | 07 |
| +138 | 08036 | 0002  read | 01 |
| +139 | 08036 | 0003  write | 00 |
| +140 | 0802A | LDA A | 07 |
| +141 | 0802B | DSZ 8038 | 07 |
| +142 | 08038 | 0002  read | 01 |
| +143 | 08038 | 0001  write | 00 |
| +144 | 0802C | JMP 8025 | 07 |
| +145 | 08025 | LDA 8037 | 07 |
| +146 | 08037 | 0002  read | 01 |
| +147 | 08026 | LDB 8036 | 07 |
| +148 | 08036 | 0003  read | 01 |
| +149 | 08027 | JSM 8093 | 07 |
| +150 | 0F9F8 | 8027  write | 00 |
| +151 | 08093 | AND 808F | 07 |
| +152 | 0808F | 00FF  read | 01 |

. 
. TRACE STATES 153 TO 193 ELIMINATED
.

| | | | |
|---|---|---|---|
| +194 | 080A6 | LDA 8092 | 07 |
| +195 | 08092 | 0006  read | 01 |
| +196 | 080A7 | RET 1 | 07 |
| +197 | 0F9F8 | 8027  read | 01 |
| +198 | 08028 | STA 8037 | 07 |
| +199 | 08037 | 0006  write | 00 |
| +200 | 08029 | ISZ 8036 | 07 |
| +201 | 08036 | 0003  read | 01 |
| +202 | 08036 | 0004  write | 00 |
| +203 | 0802A | LDA A | 07 |
| +204 | 0802B | DSZ 8038 | 07 |
| +205 | 08038 | 0001  read | 01 |
| +206 | 08038 | 0000  write | 00 |
| +207 | 0802D | LDA 8037 | 07 |
| +208 | 08037 | 0006  read | 01 |
| +209 | 0802E | STA 8035 | 07 |
| +210 | 08035 | 0006  write | 00 |
| +211 | 0802F | RET 1 | 07 |
| +212 | 0F9F7 | 8007  read | 01 |
| +213 | 08008 | LDB 8012 | 07 |
| +214 | 08012 | 0003  read | 01 |
| +215 | 08009 | ADB 8010 | 07 |
| +216 | 08010 | 8039  read | 01 |
| +217 | 0800A | STA B,I | 07 |
| +218 | 0803C | 0006  write | 00 |
| +219 | 0800B | ISZ 8012 | 07 |

```
+220    08012    0003  read      01
+221    08012    0004  write     00
+222    0800C    LDA A           07
+223    0800D    DSZ 8011        07
+224    08011    0012  read      01
+225    08011    0011  write     00
+226    0800E    JMP 8006        07
+227    08006    JSM 8013        07
+228    0F9F7    8006  write     00
+229    08013    LDA 8030        07
```

******* PAGE 1 OF APPENDIX M *******

************************************************************
**************** MAP SPECIFICATION *********************
************************************************************

| # | symbol | range | | | value |
|---|--------|-------|---|---|-------|
| 1 | symbol_map Address_symbols | | | | |
| 5 | INDEX | | | | 8012H |
| 6 | FACTORIAL | | | | 8013H |
| 7 | Z | 22H | thru | 0C2H | 42H |
| 8 | MAIN | 8002H | thru | 8012H | start |
| 9 | FACTOR | 8013H | thru | 8038H | start |
| 10 | DATA_BLOC | 8039H | thru | 804DH | start |
| 11 | BOOLEANIN | 804EH | thru | 8068H | start |
| 12 | PARAMETER | 8069H | thru | 808EH | start |
| 13 | MULTIPLY | 808FH | thru | 80A7H | start |
| 14 | STACK | 0F9F0H | thru | 0FA17H | end |
| 15 | DISPLAY | 0FA18H | thru | 0FDFFH | start |
| 16 | LINKS | 0FE00H | thru | 0FF1FH | start |
| 17 | VECTORS | 0FFF0H | thru | 0FFFFH | start |

20  symbol_map Stat_map

| # | symbol | range | value |
|---|--------|-------|-------|
| 24 | Write | | 0H |
| 25 | Read | | 1H |
| 26 | Dma_in | | 2H |
| 27 | Dma_out | | 3H |
| 28 | Io_write | | 4H |
| 29 | Io_read | | 5H |
| 30 | Opcode | | 7H |
| 31 | Error | | 1XXXB |

************************************************************
***************** ENTRY EXAMPLES ***********************
************************************************************

```
32   display symbol_map Address_symbols
33   define Z range 42H - 32 thru 42H + 128 relative_to 42H
34
35   display symbol_map Stat_map
36   define Error value 1XXXB
```

*------* PAGE 1 OF APPENDIX N ****---*

```
************************************************************
***************** FORMAT SPECIFICATION *********************
************************************************************
```

```
                              Clock
 1    Threshold:     <_____ttl_____><_____ttl_____>
 2    Channel:        7   6   5   4   3   2   1   0
 3                                                  +
 4
 5
 6
 7                         Pod 2           Pod 1 ranging
 8    __data_label__  <_____ttl_____> <_____ttl_____>
 9                    9876543210987654321O 9876543210987654321O
10    Address                              PPPPPPPPPPPPPPPP
11
12        Location:       pod_1_bit 0 thru pod_1_bit 15
13        Width:          16 bits
14        Logic polarity: positive
15        Default map:    Address_symbols
16                        ranging_label
17
18                         Pod 2           Pod 1 ranging
19    __data_label__  <_____ttl_____> <_____ttl_____>
20                    9876543210987654321O 9876543210987654321O
21    Data            PPPPPPPPPPPPPPPP
22
23        Location:       pod_2_bit 0 thru pod_2_bit 15
24        Width:          16 bits
25        Logic polarity: positive
26        Default map:    absolute
27
28
29                         Pod 2           Pod 1 ranging
30    __data_label__  <_____ttl_____> <_____ttl_____>
31                    9876543210987654321O 9876543210987654321O
32    Status                               PPP
33
34        Location:       pod_1_bit 16 thru pod_1_bit 18
35        Width:          3 bits
36        Logic polarity: positive
37        Default map:    Stat_map
```

*------* PAGE 1 OF APPENDIX O ****---*

```
************************************************************
***************** TRACE SPECIFICATION **********************
************************************************************
```

```
1    TRIGGER
2        enable_after Address = INDEX and Status = Write and Data = 3
3        on Address = FACTORIAL and Status = Opcode
4        position_is 3 states_after_start
5
6    STORE
7        on any_state
8
```

```
  9      COUNT
 10          on time

*************************************************************
*********** EXAMPLE OF OVERRIDING A DEFAULT MAP ************
*************************************************************

11      TRIGGER
 12          enable_after any_state
 13          on Data = FACTORIAL map Address_symbols
 14          position_is 3 states_after_start
 15
 16      STORE
 17          on any_state
 18
 19      COUNT
 20          on time

********** PAGE i OF APPENDIX P **********

Label:  |   Address           BPC opcode              Status
Base:   |   hex               hex                     hex
Map:        Address_symbols   Address_symbols         Stat_map
*************************************************************
-002        MAIN+00004        JSM FACTORIAL           Opcode
-001        STACK-00020       8006  write             Write
trigger     FACTORIAL         LDA FACTOR+001D         Opcode
+001        FACTOR+0001D      8032  read              Read
+002        FACTOR+00001      LDB FACTOR+001E         Opcode
+003        FACTOR+0001E      8034  read              Read
+004        FACTOR+00002      JSM PARAMETER+0004      Opcode
+005        STACK-0001F       8015  write             Write
+006        PARAMETER+00004   STA PARAMETER+0000      Opcode
+007        PARAMETER+00000   8032  write             Write .
. TRACE STATES 8 TO 52 ELIMINATED
.
+053        PARAMETER+00025   JMP PARAMETER+0003,I    Opcode
+054        PARAMETER+00003   8016  read              Read
+055        FACTOR+00003      LDA Z+0001              Opcode
+056        Z+00001           0001  read              Read
+057        FACTOR+00004      STA FACTOR+0024         Opcode
+058        FACTOR+00024      0001  write             Write
+059        FACTOR+00005      LDB FACTOR+0021         Opcode
+060        FACTOR+00021      0003  read              Read
+061        FACTOR+00006      LDA Z+0003              Opcode
+062        Z+00003           0003  read              Read
+063        FACTOR+00007      JSM BOOLEANIN+0011      Opcode
+064        STACK-0001F       801A  write             Write
+065        BOOLEANIN+00011   SBM BOOLEANIN+0019      Opcode
+066        BOOLEANIN+00012   ADB Z-0010              Opcode
+067        Z-00010           FFF0  read              Read
+068        BOOLEANIN+00013   SBP BOOLEANIN+0019      Opcode
+069        BOOLEANIN+00014   ADB BOOLEANIN+0010      Opcode
+070        BOOLEANIN+00010   805E  read              Read
+071        BOOLEANIN+00015   AND B,I                 Opcode
+072        BOOLEANIN+00003   0008  read              Read
+073        BOOLEANIN+00016   SZA BOOLEANIN+001A      Opcode
+074        BOOLEANIN+0001A   RET 1                   Opcode
+075        STACK-0001F       801A  read              Read
```

| | | | |
|---|---|---|---|
| +076 | FACTOR+00008 | RLA FACTOR+001A | Opcode |
| +077 | FACTOR+00009 | LDA Z+0002 | Opcode |
| +078 | Z+00002 | 0002 read | Read |
| +079 | FACTOR+0000A | TCA | Opcode |
| +080 | FACTOR+0000B | ADA FACTOR+0021 | Opcode |
| +081 | FACTOR+00021 | 0003 read | Read |
| +082 | FACTOR+0000C | ISZ A | Opcode |
| +083 | FACTOR+0000D | SAP FACTOR+000F | Opcode |
| +084 | FACTOR+0000F | STA FACTOR+0025 | Opcode |
| +085 | FACTOR+00025 | 0002 write | Write |
| +086 | FACTOR+00010 | LDA Z+0002 | Opcode |
| +087 | Z+00002 | 0002 read | Read |
| +088 | FACTOR+00011 | STA FACTOR+0023 | Opcode |
| +089 | FACTOR+00023 | 0002 write | Write |
| +090 | FACTOR+00012 | LDA FACTOR+0024 | Opcode |
| +091 | FACTOR+00024 | 0001 read | Read |
| +092 | FACTOR+00013 | LDB FACTOR+0023 | Opcode |
| +093 | FACTOR+00023 | 0002 read | Read |
| +094 | FACTOR+00014 | JSM MULTIPLY+0004 | Opcode |
| +095 | STACK-0001F | 8027 write | Write |
| +096 | MULTIPLY+00004 | AND MULTIPLY+0000 | Opcode |
| +097 | MULTIPLY+00000 | 00FF read | Read |

. TRACE STATES 98 TO 130 ELIMINATED

| | | | |
|---|---|---|---|
| +131 | MULTIPLY+00017 | LDA MULTIPLY+0003 | Opcode |
| +132 | MULTIPLY+00003 | 0002 read | Read |
| +133 | MULTIPLY+00018 | RET 1 | Opcode |
| +134 | STACK-0001F | 8027 read | Read |
| +135 | FACTOR+00015 | STA FACTOR+0024 | Opcode |
| +136 | FACTOR+00024 | 0002 write | Write |
| +137 | FACTOR+00016 | ISZ FACTOR+0023 | Opcode |
| +138 | FACTOR+00023 | 0002 read | Read |
| +139 | FACTOR+00023 | 0003 write | Write |
| +140 | FACTOR+00017 | LDA A | Opcode |
| +141 | FACTOR+00018 | DSZ FACTOR+0025 | Opcode |
| +142 | FACTOR+00025 | 0002 read | Read |
| +143 | FACTOR+00025 | 0001 write | Write |
| +144 | FACTOR+00019 | JMP FACTOR+0012 | Opcode |
| +145 | FACTOR+00012 | LDA FACTOR+0024 | Opcode |
| +146 | FACTOR+00024 | 0002 read | Read |
| +147 | FACTOR+00013 | LDB FACTOR+0023 | Opcode |
| +148 | FACTOR+00023 | 0003 read | Read |
| +149 | FACTOR+00014 | JSM MULTIPLY+0004 | Opcode |
| +150 | STACK-0001F | 8027 write | Write |
| +151 | MULTIPLY+00004 | AND MULTIPLY+0000 | Opcode |
| +152 | MULTIPLY+00000 | 00FF read | Read |

. TRACE STATES 153 TO 193 ELIMINATED

| | | | |
|---|---|---|---|
| +194 | MULTIPLY+00017 | LDA MULTIPLY+0003 | Opcode |
| +195 | MULTIPLY+00003 | 0006 read | Read |
| +196 | MULTIPLY+00018 | RET 1 | Opcode |
| +197 | STACK-0001F | 8027 read | Read |
| +198 | FACTOR+00015 | STA FACTOR+0024 | Opcode |
| +199 | FACTOR+00024 | 0006 write | Write |
| +200 | FACTOR+00016 | ISZ FACTOR+0023 | Opcode |
| +201 | FACTOR+00023 | 0003 read | Read |
| +202 | FACTOR+00023 | 0004 write | Write |
| +203 | FACTOR+00017 | LDA A | Opcode |
| +204 | FACTOR+00018 | DSZ FACTOR+0025 | Opcode |
| +205 | FACTOR+00025 | 0001 read | Read |

| | | | |
|---|---|---|---|
| +206 | FACTOR+00025 | 0000 write | Write |
| +207 | FACTOR+0001A | LDA FACTOR+0024 | Opcode |
| +208 | FACTOR+00024 | 0006 read | Read |
| +209 | FACTOR+0001B | STA FACTOR+0022 | Opcode |
| +210 | FACTOR+00022 | 0006 write | Write |
| +211 | FACTOR+0001C | RET 1 | Opcode |
| +212 | STACK-00020 | 8007 read | Read |
| +213 | MAIN+00006 | LDB INDEX | Opcode |
| +214 | INDEX | 0003 read | Read |
| +215 | MAIN+00007 | ADB MAIN+000E | Opcode |
| +216 | MAIN+0000E | 8039 read | Read |
| +217 | MAIN+00008 | STA B,I | Opcode |
| +218 | DATA_BLOC+00003 | 0006 write | Write |
| +219 | MAIN+00009 | ISZ INDEX | Opcode |
| +220 | INDEX | 0003 read | Read |
| +221 | INDEX | 0004 write | Write |
| +222 | MAIN+0000A | LDA A | Opcode |
| +223 | MAIN+0000B | DSZ MAIN+000F | Opcode |
| +224 | MAIN+0000F | 0012 read | Read |
| +225 | MAIN+0000F | 0011 write | Write |
| +226 | MAIN+0000C | JMP MAIN+0004 | Opcode |
| +227 | MAIN+00004 | JSM FACTORIAL | Opcode |
| +228 | STACK-00020 | 8006 write | Write |
| +229 | FACTORIAL | LDA FACTOR+001D | Opcode |

******** PAGE 1 OF APPENDIX Q ********

****************************************************************
**************** MAP SPECIFICATION ****************
****************************************************************

```
1   symbol_map Address_symbols
2
3       symbol                  range                   value
4       ****************************************************************
5    Z                       22H    thru    0C2H           42H
6    STACK                   0F9F0H thru    0FA17H         end
7    DISPLAY                 0FA18H thru    0FDFFH         start
8    LINKS                   0FE00H thru    0FF1FH         start
9    VECTORS                 0FFF0H thru    0FFFFH         start
10
11
12  symbol_map Stat_map
13
14      symbol                  range                   value
15      ****************************************************************
16   Write                                                   0H
17   Read                                                    1H
18   Dma_in                                                  2H
19   Dma_out                                                 3H
20   Io_write                                                4H
21   Io_read                                                 5H
22   Opcode                                                  7H
23
24
25  linked_files
26
27      #     file                    range           segment
28      ****************************************************************
```

| | | | | | |
|---|---|---|---|---|---|
| 29 | 1 | MAIN:EXAMPL | 8002H thru | 8012H | prog |
| 30 | 2 | FACTOR:EXAMPL | 8013H thru | 8038H | prog |
| 31 | 3 | DATA_BLOC:EXAMPL | 8039H thru | 804DH | prog |
| 32 | 4 | BOOLEANIN:EXAMPL | 804EH thru | 8068H | prog |
| 33 | 5 | PARAMETER:EXAMPL | 8069H thru | 808EH | prog |
| 34 | 6 | MULTIPLY :EXAMPL | 808FH thru | 80A7H | prog |

******* PAGE 1 OF APPENDIX R *******

##########################################################
########## TRACE SPECIFICATION ####################
##########################################################

```
1    TRIGGER
2         enable_after Address = INDEX file MAIN:EXAMPL and Status
3                      = Write and Data = 3
4         on Address = FACTORIAL file FACTOR:EXAMPL and Status = Opcode
5         position_is 3 states_after_start
6
7    STORE
8         on any_state
9
10   COUNT
11        on time
```

******* PAGE 1 OF APPENDIX S *******

```
Label:    Address           BPC opcode                      Status
Base:     hex               hex                             hex
Map:      Address symbols   Address symbols                 Stat map
###############################################################
-002      MAIN00_L2,MAIN    JSM FACTORIAL,FACTOR            Opcode
-001      STACK-00020       8006  write                     Write
trigger   FACTORIAL,FACTOR  LDA FACTORI01_C,FACTOR          Opcode
+001      FACTORI01_C,FACT  8032  read                      Read
+002      FACTOR+00001      LDB FACTOR+001E                 Opcode
+003      FACTOR+0001E      8034  read                      Read
+004      FACTOR+00002      JSM PARAMETER_ENTRY,PARAMETER   Opcode
+005      STACK-0001F       8015  write                     Write
+006      PARAMETER_ENTRY,  STA DOPEVECTOR ,PARAMETER       Opcode
+007      DOPEVECTOR ,PARA  8032  write                     Write
.
. TRACE STATES 8 TO 52 ELIMINATED
.
+053      PARAMETER+00025   JMP PROCEDURE_ENTRY,PARAMETER,I Opcode
+054      PROCEDURE_ENTRY,  8016  read                      Read
+055      FACTOR+00003      LDA Z+0001                      Opcode
+056      Z+00001           0001  read                      Read
+057      FACTOR+00004      STA FACTOR+0024                 Opcode
+058      FACTOR+00024      0001  write                     Write
+059      FACTOR+00005      LDB FACTORI01_D,FACTOR          Opcode
+060      FACTORI01_D,FACT  0003  read                      Read
+061      FACTOR+00006      LDA Z+0003                      Opcode
+062      Z+00003           0003  read                      Read
+063      FACTOR+00007      JSM BOOLEANIN_ENTRY,BOOLEANIN   Opcode
+064      STACK-0001F       801A  write                     Write
+065      BOOLEANIN_ENTRY,  SBM FALSE,BOOLEANIN             Opcode
+066      BOOLEANIN+00012   ADB Z-0010                      Opcode
+067      Z-00010           FFF0  read                      Read
+068      BOOLEANIN+00013   SBP FALSE,BOOLEANIN             Opcode
```

| | | | |
|---|---|---|---|
| +069 | BOOLEANIN+00014 | ADB DEFB0,BOOLEANIN | Opcode |
| +070 | DEFB0,BOOLEANIN | 805E read | Read |
| +071 | BOOLEANIN+00015 | AND B,I | Opcode |
| +072 | B3 ,BOOLEANIN | 0008 read | Read |
| +073 | BOOLEANIN+00016 | SZA DONE ,BOOLEANIN | Opcode |
| +074 | DONE ,BOOLEANIN | RET 1 | Opcode |
| +075 | STACK-0001F | 801A read | Read |
| +076 | FACTOR+00008 | RLA FACTORI01_L1 ,FACTOR | Opcode |
| +077 | FACTOR+00009 | LDA Z+0002 | Opcode |
| +078 | Z+00002 | 0002 read | Read |
| +079 | FACTOR+0000A | TCA | Opcode |
| +080 | FACTOR+0000B | ADA FACTORI01_D,FACTOR | Opcode |
| +081 | FACTORI01_D,FACT | 0003 read | Read |
| +082 | FACTOR+0000C | ISZ A | Opcode |
| +083 | FACTOR+0000D | SAP FACTOR+000F | Opcode |
| +084 | FACTOR+0000F | STA FACTOR+0025 | Opcode |
| +085 | FACTOR+00025 | 0002 write | Write |
| +086 | FACTOR+00010 | LDA Z+0002 | Opcode |
| +087 | Z+00002 | 0002 read | Read |
| +088 | FACTOR+00011 | STA FACTOR+0023 | Opcode |
| +089 | FACTOR+00023 | 0002 write | Write |
| +090 | FACTORI01_L2 ,FA | LDA FACTOR+0024 | Opcode |
| +091 | FACTOR+00024 | 0001 read | Read |
| +092 | FACTOR+00013 | LDB FACTOR+0023 | Opcode |
| +093 | FACTOR+00023 | 0002 read | Read |
| +094 | FACTOR+00014 | JSM MULTIPLY_ENTRY,MULTIPLY | Opcode |
| +095 | STACK-0001F | 8027 write | Write |
| +096 | MULTIPLY_ENTRY,M | AND ML8,MULTIPLY | Opcode |
| +097 | ML8,MULTIPLY | 00FF read | Read |

. TRACE STATES 98 TO 130 ELIMINATED

| | | | |
|---|---|---|---|
| +131 | DONE ,MULTIPLY | LDA PRODUCT,MULTIPLY | Opcode |
| +132 | PRODUCT,MULTIPLY | 0002 read | Read |
| +133 | MULTIPLY +00018 | RET 1 | Opcode |
| +134 | STACK-0001F | 8027 read | Read |
| +135 | FACTOR+00015 | STA FACTOR+0024 | Opcode |
| +136 | FACTOR+00024 | 0002 write | Write |
| +137 | FACTOR+00016 | ISZ FACTOR+0023 | Opcode |
| +138 | FACTOR+00023 | 0002 read | Read |
| +139 | FACTOR+00023 | 0003 write | Write |
| +140 | FACTOR+00017 | LDA A | Opcode |
| +141 | FACTOR+00018 | DSZ FACTOR+0025 | Opcode |
| +142 | FACTOR+00025 | 0002 read | Read |
| +143 | FACTOR+00025 | 0001 write | Write |
| +144 | FACTOR+00019 | JMP FACTORI01_L2 ,FACTOR | Opcode |
| +145 | FACTORI01_L2 ,FA | LDA FACTOR+0024 | Opcode |
| +146 | FACTOR+00024 | 0002 read | Read |
| +147 | FACTOR+00013 | LDB FACTOR+0023 | Opcode |
| +148 | FACTOR+00023 | 0003 read | Read |
| +149 | FACTOR+00014 | JSM MULTIPLY_ENTRY,MULTIPLY | Opcode |
| +150 | STACK-0001F | 8027 write | Write |
| +151 | MULTIPLY_ENTRY,M | AND ML8,MULTIPLY | Opcode |
| +152 | ML8,MULTIPLY | 00FF read | Read |

. TRACE STATES 153 TO 193 ELIMINATED

| | | | |
|---|---|---|---|
| +194 | DONE ,MULTIPLY | LDA PRODUCT,MULTIPLY | Opcode |
| +195 | PRODUCT,MULTIPLY | 0006 read | Read |
| +196 | MULTIPLY +00018 | RET 1 | Opcode |
| +197 | STACK-0001F | 8027 read | Read |

| | | | |
|---|---|---|---|
| +198 | FACTOR+00015 | STA FACTOR+0024 | Opcode |
| +199 | FACTOR+00024 | 0006 write | Write |
| +200 | FACTOR+00016 | ISZ FACTOR+0023 | Opcode |
| +201 | FACTOR+00023 | 0003 read | Read |
| +202 | FACTOR+00023 | 0004 write | Write |
| +203 | FACTOR+00017 | LDA A | Opcode |
| +204 | FACTOR+00018 | DSZ FACTOR+0025 | Opcode |
| +205 | FACTOR+00025 | 0001 read | Read |
| +206 | FACTOR+00025 | 0000 write | Write |
| +207 | FACTORI01_L1,FA | LDA FACTOR+0024 | Opcode |
| +208 | FACTOR+00024 | 0006 read | Read |
| +209 | FACTOR+0001B | STA FACTOR+0022 | Opcode |
| +210 | FACTOR+00022 | 0006 write | Write |
| +211 | FACTOR+0001C | RET 1 | Opcode |
| +212 | STACK-00020 | 8007 read | Read |
| +213 | MAIN+00006 | LDB INDEX,MAIN | Opcode |
| +214 | INDEX,MAIN | 0003 read | Read |
| +215 | MAIN+00007 | ADB MAIN00_C,MAIN | Opcode |
| +216 | MAIN00_C,MAIN | 8039 read | Read |
| +217 | MAIN+00008 | STA B,I | Opcode |
| +218 | DATA_BLOC+00003 | 0006 write | Write |
| +219 | MAIN+00009 | ISZ INDEX,MAIN | Opcode |
| +220 | INDEX,MAIN | 0003 read | Read |
| +221 | INDEX,MAIN | 0004 write | Write |
| +222 | MAIN+0000A | LDA A | Opcode |
| +223 | MAIN+0000B | DSZ MAIN00_D,MAIN | Opcode |
| +224 | MAIN00_D,MAIN | 0012 read | Read |
| +225 | MAIN00_D,MAIN | 0011 write | Write |
| +226 | MAIN+0000C | JMP MAIN00_L2,MAIN | Opcode |
| +227 | MAIN00_L2,MAIN | JSM FACTORIAL,FACTOR | Opcode |
| +228 | STACK-00020 | 8006 write | Write |
| +229 | FACTORIAL,FACTOR | LDA FACTORI01_C,FACTOR | Opcode |

******** PAGE 1 OF APPENDIX T ********

| Label: | line# | Address | BPC opcode | Status |
|---|---|---|---|---|
| Base: | | hex | hex | hex |
| Map: | | Address symbols | Address symbols | Stat map |

| | | | | |
|---|---|---|---|---|
| -002 | # | 18 MAIN00_L2,MAIN | JSM FACTORIAL,FACTOR | Opcode |
| -001 | | STACK-00020 | 8006 write | Write |
| trigger | # | 8 FACTORIAL,FACTOR | LDA FACTORI01_C,FACTOR | Opcode |
| +001 | | FACTORI01_C,FACT | 8032 read | Read |
| +002 | # | 8 FACTOR+00001 | LDB FACTOR+001E | Opcode |
| +003 | | FACTOR+0001E | 8034 read | Read |
| +004 | # | 8 FACTOR+00002 | JSM PARAMETER_ENTRY,PARAMETER | Opcode |
| +005 | | STACK-0001F | 8015 write | Write |
| +006 | | PARAMETER_ENTRY, | STA DOPEVECTOR,PARAMETER | Opcode |
| +007 | | DOPEVECTOR,PARA | 8032 write | Write |

. TRACE STATES 8 TO 52 ELIMINATED

| | | | | |
|---|---|---|---|---|
| +053 | | PARAMETER+00025 | JMP PROCEDURE_ENTRY,PARAMETER,I | Opcode |
| +054 | | PROCEDURE_ENTRY, | 8016 read | Read |
| +055 | # | 9 FACTOR+00003 | LDA Z+0001 | Opcode |
| +056 | | Z+00001 | 0001 read | Read |
| +057 | # | 9 FACTOR+00004 | STA FACTOR+0024 | Opcode |
| +058 | | FACTOR+00024 | 0001 write | Write |
| +059 | # | 10 FACTOR+00005 | LDB FACTORI01_D,FACTOR | Opcode |
| +060 | | FACTORI01_D,FACT | 0003 read | Read |
| +061 | # | 10 FACTOR+00006 | LDA Z+0003 | Opcode |
| +062 | | Z+00003 | 0003 read | Read |

| | | | | |
|---|---|---|---|---|
| +063 | # | 10 | FACTOR+00007 JSM BOOLEANIN_ENTRY,BOOLEANIN | Opcode |
| +064 | | | STACK-0001F   801A   write | Write |
| +065 | | | BOOLEANIN_ENTRY, SBM FALSE,BOOLEANIN | Opcode |
| +066 | | | BOOLEANIN+00012 ADB Z-0010 | Opcode |
| +067 | | | Z-00010   FFF0   read | Read |
| +068 | | | BOOLEANIN+00013 SBP FALSE,BOOLEANIN | Opcode |
| +069 | | | BOOLEANIN+00014 ADB DEFB0,BOOLEANIN | Opcode |
| +070 | | | DEFB0,BOOLEANIN   805E   read | Read |
| +071 | | | BOOLEANIN+00015 AND B,I | Opcode |
| +072 | | | B3 ,BOOLEANIN   0008   read | Read |
| +073 | | | BOOLEANIN+00016 SZA DONE ,BOOLEANIN | Opcode |
| +074 | | | DONE ,BOOLEANIN   RET 1 | Opcode |
| +075 | | | STACK-0001F   801A   read | Read |
| +076 | # | 10 | FACTOR+00008 RLA FACTORI01_L1 ,FACTOR | Opcode |
| +077 | # | 11 | FACTOR+00009 LDA Z+0002 | Opcode |
| +078 | | | Z+00002   0002   read | Read |
| +079 | # | 11 | FACTOR+0000A TCA | Opcode |
| +080 | # | 11 | FACTOR+0000B ADA FACTORI01_D,FACTOR | Opcode |
| +081 | | | FACTORI01_D,FACT   0003   read | Read |
| +082 | # | 11 | FACTOR+0000C ISZ A | Opcode |
| +083 | # | 11 | FACTOR+0000D SAP FACTOR+000F | Opcode |
| +084 | # | 11 | FACTOR+0000F STA FACTOR+0025 | Opcode |
| +085 | | | FACTOR+00025   0002   write | Write |
| +086 | # | 11 | FACTOR+00010 LDA Z+0002 | Opcode |
| +087 | | | Z+00002   0002   read | Read |
| +088 | # | 11 | FACTOR+00011 STA FACTOR+0023 | Opcode |
| +089 | | | FACTOR+00023   0002   write | Write |
| +090 | # | 12 | FACTORI01_L2 ,FA LDA FACTOR+0024 | Opcode |
| +091 | | | FACTOR+00024   0001   read | Read |
| +092 | # | 12 | FACTOR+00013 LDB FACTOR+0023 | Opcode |
| +093 | | | FACTOR+00023   0002   read | Read |
| +094 | # | 12 | FACTOR+00014 JSM MULTIPLY_ENTRY,MULTIPLY | Opcode |
| +095 | | | STACK-0001F   8027   write | Write |
| +096 | | | MULTIPLY_ENTRY,M AND ML8,MULTIPLY | Opcode |
| +097 | | | ML8,MULTIPLY   00FF   read | Read |

.
. TRACE STATES 98 TO 130 ELIMINATED
.

| | | | | |
|---|---|---|---|---|
| +131 | | | DONE ,MULTIPLY   LDA PRODUCT,MULTIPLY | Opcode |
| +132 | | | PRODUCT,MULTIPLY   0002   read | Read |
| +133 | | | MULTIPLY +00018 RET 1 | Opcode |
| +134 | | | STACK-0001F   8027   read | Read |
| +135 | # | 12 | FACTOR+00015 STA FACTOR+0024 | Opcode |
| +136 | | | FACTOR+00024   0002   write | Write |
| +137 | # | 12 | FACTOR+00016 ISZ FACTOR+0023 | Opcode |
| +138 | | | FACTOR+00023   0002   read | Read |
| +139 | | | FACTOR+00023   0003   write | Write |
| +140 | # | 12 | FACTOR+00017 LDA A | Opcode |
| +141 | # | 12 | FACTOR+00018 DSZ FACTOR+0025 | Opcode |
| +142 | | | FACTOR+00025   0002   read | Read |
| +143 | | | FACTOR+00025   0001   write | Write |
| +144 | # | 12 | FACTOR+00019 JMP FACTORI01_L2 ,FACTOR | Opcode |
| +145 | # | 12 | FACTORI01_L2 ,FA LDA FACTOR+0024 | Opcode |
| +146 | | | FACTOR+00024   0002   read | Read |
| +147 | # | 12 | FACTOR+00013 LDB FACTOR+0023 | Opcode |
| +148 | | | FACTOR+00023   0003   read | Read |
| +149 | # | 12 | FACTOR+00014 JSM MULTIPLY_ENTRY,MULTIPLY | Opcode |
| +150 | | | STACK-0001F   8027   write | Write |
| +151 | | | MULTIPLY_ENTRY,M AND ML8,MULTIPLY | Opcode |
| +152 | | | ML8,MULTIPLY   00FF   read | Read |

.
. TRACE STATES 153 TO 193 ELIMINATED

| | | | | |
|---|---|---|---|---|
| +194 | | DONE ,MULTIPLY | LDA PRODUCT,MULTIPLY | Opcode |
| +195 | | PRODUCT,MULTIPLY | 0006 read | Read |
| +196 | | MULTIPLY +00018 | RET 1 | Opcode |
| +197 | | STACK-0001F | 8027 read | Read |
| +198 | # 12 | FACTOR+00015 | STA FACTOR+0024 | Opcode |
| +199 | | FACTOR+00024 | 0006 write | Write |
| +200 | # 12 | FACTOR+00016 | ISZ FACTOR+0023 | Opcode |
| +201 | | FACTOR+00023 | 0003 read | Read |
| +202 | | FACTOR+00023 | 0004 write | Write |
| +203 | # 12 | FACTOR+00017 | LDA A | Opcode |
| +204 | # 12 | FACTOR+00018 | DSZ FACTOR+0025 | Opcode |
| +205 | | FACTOR+00025 | 0001 read | Read |
| +206 | | FACTOR+00025 | 0000 write | Write |
| +207 | # 13 | FACTORIO1_L1 ,FA | LDA FACTOR+0024 | Opcode |
| +208 | | FACTOR+00024 | 0006 read | Read |
| +209 | | FACTOR+0001B | STA FACTOR+0022 | Opcode |
| +210 | # 13 | FACTOR+00022 | 0006 write | Write |
| +211 | # 14 | FACTOR+0001C | RET 1 | Opcode |
| +212 | | STACK-00020 | 8007 read | Read |
| +213 | # 18 | MAIN+00006 | LDB INDEX,MAIN | Opcode |
| +214 | | INDEX,MAIN | 0003 read | Read |
| +215 | # 18 | MAIN+00007 | ADB MAINOO_C ,MAIN | Opcode |
| +216 | | MAINOO_C ,MAIN | 8039 read | Read |
| +217 | # 18 | MAIN+00008 | STA B,I | Opcode |
| +218 | | DATA_BLOC+00003 | 0006 write | Write |
| +219 | # 19 | MAIN+00009 | ISZ INDEX,MAIN | Opcode |
| +220 | | INDEX,MAIN | 0003 read | Read |
| +221 | | INDEX,MAIN | 0004 write | Write |
| +222 | # 19 | MAIN+0000A | LDA A | Opcode |
| +223 | # 19 | MAIN+0000B | DSZ MAINOO_D ,MAIN | Opcode |
| +224 | | MAINOO_D ,MAIN | 0012 read | Read |
| +225 | | MAINOO_D ,MAIN | 0011 write | Write |
| +226 | # 19 | MAIN+0000C | JMP MAINOO_L2,MAIN | Opcode |
| +227 | # 20 | MAINOO_L2,MAIN | JSM FACTORIAL,FACTOR | Opcode |
| +228 | | STACK-00020 | 8006 write | Write |
| +229 | # 8 | FACTORIAL,FACTOR | LDA FACTORIO1_C,FACTOR | Opcode |

#### PAGE 1 OF APPENDIX U ##########

| | | | | |
|---|---|---|---|---|
| Label: | line# | Address | BPC opcode | Status |
| Base: | | hex | hex | hex |
| Map: | | Address symbols | Address symbols | Stat map |

| DATA_BLOCK[INDEX] := FACTORIAL(INDEX); |
|---|

| | | | | |
|---|---|---|---|---|
| -002 | # 18 | MAINOO_L2,MAIN | JSM FACTORIAL,FACTOR | Opcode |
| -001 | | STACK-00020 | 8006 write | Write |

| BEGIN |
|---|

| | | | | |
|---|---|---|---|---|
| trigger | # 8 | FACTORIAL,FACTOR | LDA FACTORIO1_C,FACTOR | Opcode |
| +001 | | FACTORIO1_C,FACT | 8032 read | Read |
| +002 | # 8 | FACTOR+00001 | LDB FACTOR+001E | Opcode |
| +003 | | FACTOR+0001E | 8034 read | Read |
| +004 | # 8 | FACTOR+00002 | JSM PARAMETER_ENTRY,PARAMETER | Opcode |
| +005 | | STACK-0001F | 8015 write | Write |
| +006 | | PARAMETER_ENTRY, | STA DOPEVECTOR ,PARAMETER | Opcode |
| +007 | | DOPEVECTOR ,PARA | 8032 write | Write |
| +008 | | PARAMETER+00005 | DSZ B | Opcode |
| +009 | | PARAMETER+00006 | STB D | Opcode |
| +010 | | PARAMETER+00007 | LDB R,I | Opcode |

| | | | |
|---|---|---|---|
| +011 | STACK-0001F | 8015 read | Read |
| +012 | PARAMETER+00008 | SIB PARAMETER+0009 | Opcode |
| +013 | PARAMETER+00009 | STB PROCEDURE_ENTRY,PARAMETER | Opcode |
| +014 | PROCEDURE_ENTRY, | 8016 write | Write |
| +015 | PARAMETER+0000A | DSZ R | Opcode |
| +016 | PARAMETER+0000B | LDB R,I | Opcode |
| +017 | STACK-00020 | 8006 read | Read |
| +018 | PARAMETER+0000C | SIB PARAMETER+000D | Opcode |
| +019 | PARAMETER+0000D | STB C | Opcode |
| +020 | PARAMETER+0000E | LDB A,I | Opcode |
| +021 | FACTORI01_E,FACT | 0001 read | Read |
| +022 | PARAMETER+0000F | STB COUNT,PARAMETER | Opcode |
| +023 | COUNT,PARAMETER | 0001 write | Write |
| +024 | PARAMETER+00010 | ADB R,I | Opcode |
| +025 | STACK-00020 | 8006 read | Read |
| +026 | PARAMETER+00011 | STB R,I | Opcode |
| +027 | STACK-00020 | 8007 write | Write |
| +028 | LOOP ,PARAMETER | ISZ DOPEVECTOR ,PARAMETER | Opcode |
| +029 | DOPEVECTOR ,PARA | 8032 read | Read |
| +030 | DOPEVECTOR ,PARA | 8033 write | Write |
| +031 | PARAMETER+00013 | WWC A,I | Opcode |
| +032 | MAIN+00005 | 8012 read | Read |
| +033 | PARAMETER+00014 | RZA DIRECT ,PARAMETER | Opcode |
| +034 | DIRECT ,PARAMETE | LDB DOPEVECTOR ,PARAMETER,I | Opcode |
| +035 | DOPEVECTOR ,PARA | 8033 read | Read |
| +036 | FACTOR+00020 | 0002 read | Read |
| +037 | PARAMETER+00019 | SBM VAR,PARAMETER | Opcode |
| +038 | PARAMETER+0001A | SBR 1 | Opcode |
| +039 | PARAMETER+0001B | STB SIZE ,PARAMETER | Opcode |
| +040 | SIZE ,PARAMETER | 0001 write | Write |
| +041 | VALOOP ,PARAMETE | LDB A,I | Opcode |
| +042 | INDEX,MAIN | 0003 read | Read |
| +043 | PARAMETER+0001D | PWD B,I | Opcode |
| +044 | FACTORI01_D,FACT | 0003 write | Write |
| +045 | PARAMETER+0001E | SIA PARAMETER+001F | Opcode |
| +046 | PARAMETER+0001F | DSZ SIZE ,PARAMETER | Opcode |
| +047 | SIZE ,PARAMETER | 0001 read | Read |
| +048 | SIZE ,PARAMETER | 0000 write | Write |
| +049 | PARAMETER+00021 | JMP DONE ,PARAMETER | Opcode |
| +050 | DONE ,PARAMETER | DSZ COUNT,PARAMETER | Opcode |
| +051 | COUNT,PARAMETER | 0001 read | Read |
| +052 | COUNT,PARAMETER | 0000 write | Write |
| +053 | PARAMETER+00025 | JMP PROCEDURE_ENTRY,PARAMETER,I | Opcode |
| +054 | PROCEDURE_ENTRY, | 8016 read | Read |

```
      SUM :=1;
```

| | | | | |
|---|---|---|---|---|
| +055 | # 9 | FACTOR+00003 | LDA Z+0001 | Opcode |
| +056 | | Z+00001 | 0001 read | Read |
| +057 | # 9 | FACTOR+00004 | STA FACTOR+0024 | Opcode |
| +058 | | FACTOR+00024 | 0001 write | Write |

```
      IF NOT(NUMBER IN [0,1]) THEN
```

| | | | | |
|---|---|---|---|---|
| +059 | # 10 | FACTOR+00005 | LDB FACTORI01_D,FACTOR | Opcode |
| +060 | | FACTORI01_D,FACT | 0003 read | Read |
| +061 | # 10 | FACTOR+00006 | LDA Z+0003 | Opcode |
| +062 | | Z+00003 | 0003 read | Read |
| +063 | # 10 | FACTOR+00007 | JSM BOOLEANIN_ENTRY,BOOLEANIN | Opcode |
| +064 | | STACK-0001F | 801A write | Write |
| +065 | | BOOLEANIN_ENTRY, | SBM FALSE,BOOLEANIN | Opcode |
| +066 | | BOOLEANIN+00012 | ADB Z-0010 | Opcode |

| | | | | |
|---|---|---|---|---|
| +067 | | | Z-00010 FFF0 read | Read |
| +068 | | | BOOLEANIN+00013 SBP FALSE,BOOLEANIN | Opcode |
| +069 | | | BOOLEANIN+00014 ADB DEFB0,BOOLEANIN | Opcode |
| +070 | | | DEFB0,BOOLEANIN 805E read | Read |
| +071 | | | BOOLEANIN+00015 AND B,I | Opcode |
| +072 | | | B3 ,BOOLEANIN 0008 read | Read |
| +073 | | | BOOLEANIN+00016 SZA DONE ,BOOLEANIN | Opcode |
| +074 | | | DONE ,BOOLEANIN RET 1 | Opcode |
| +075 | | | STACK-0001F 801A read | Read |
| +076 | # | 10 | FACTOR+00008 RLA FACTORI01_L1 ,FACTOR | Opcode |

```
    FOR I := 2 TO NUMBER DO
```

| | | | | |
|---|---|---|---|---|
| +077 | # | 11 | FACTOR+00009 LDA Z+0002 | Opcode |
| +078 | | | Z+00002 0002 read | Read |
| +079 | # | 11 | FACTOR+0000A TCA | Opcode |
| +080 | # | 11 | FACTOR+0000B ADA FACTORI01_D,FACTOR | Opcode |
| +081 | | | FACTORI01_D,FACT 0003 read | Read |
| +082 | # | 11 | FACTOR+0000C ISZ A | Opcode |
| +083 | # | 11 | FACTOR+0000D SAP FACTOR+000F | Opcode |
| +084 | # | 11 | FACTOR+0000F STA FACTOR+0025 | Opcode |
| +085 | | | FACTOR+00025 0002 write | Write |
| +086 | # | 11 | FACTOR+00010 LDA Z+0002 | Opcode |
| +087 | | | Z+00002 0002 read | Read |
| +088 | # | 11 | FACTOR+00011 STA FACTOR+0023 | Opcode |
| +089 | | | FACTOR+00023 0002 write | Write |

```
    SUM := SUM * I;
```

| | | | | |
|---|---|---|---|---|
| +090 | # | 12 | FACTORI01_L2 ,FA LDA FACTOR+0024 | Opcode |
| +091 | | | FACTOR+00024 0001 read | Read |
| +092 | # | 12 | FACTOR+00013 LDB FACTOR+0023 | Opcode |
| +093 | | | FACTOR+00023 0002 read | Read |
| +094 | # | 12 | FACTOR+00014 JSM MULTIPLY_ENTRY,MULTIPLY | Opcode |
| +095 | | | STACK-0001F 8027 write | Write |
| +096 | | | MULTIPLY_ENTRY,M AND ML8,MULTIPLY | Opcode |
| +097 | | | ML8,MULTIPLY 00FF read | Read |
| +098 | | | MULTIPLY +00005 STA FACTOR1,MULTIPLY | Opcode |
| +099 | | | FACTOR1,MULTIPLY 0001 write | Write |
| +100 | | | MULTIPLY +00006 LDA Z+0008 | Opcode |
| +101 | | | Z+00008 0008 read | Read |
| +102 | | | MULTIPLY +00007 STA LOOP_COUNT ,MULTIPLY | Opcode |
| +103 | | | LOOP_COUNT ,MULT 0008 write | Write |
| +104 | | | MULTIPLY +00008 LDA Z+0000 | Opcode |
| +105 | | | Z+00000 0000 read | Read |
| +106 | | | MULTIPLY +00009 STA PRODUCT,MULTIPLY | Opcode |
| +107 | | | PRODUCT,MULTIPLY 0000 write | Write |
| +108 | | | MULTIPLY +0000A LDA FACTOR1,MULTIPLY | Opcode |
| +109 | | | FACTOR1,MULTIPLY 0001 read | Read |
| +110 | | | MULTIPLY +0000B SBL 8 | Opcode |
| +111 | | | MULTIPLY +0000C SBR 8 | Opcode |
| +112 | | | MULT_LOOP,MULTIP SLB NOADD,MULTIPLY | Opcode |
| +113 | | | NOADD,MULTIPLY SBR 1 | Opcode |
| +114 | | | MULTIPLY +00013 SZB DONE ,MULTIPLY | Opcode |
| +115 | | | MULTIPLY +00014 SAL 1 | Opcode |
| +116 | | | MULTIPLY +00015 DSZ LOOP_COUNT ,MULTIPLY | Opcode |
| +117 | | | LOOP_COUNT ,MULT 0008 read | Read |
| +118 | | | LOOP_COUNT ,MULT 0007 write | Write |
| +119 | | | MULTIPLY +00016 JMP MULT_LOOP,MULTIPLY | Opcode |
| +120 | | | MULT_LOOP,MULTIP SLB NOADD,MULTIPLY | Opcode |
| +121 | | | MULTIPLY +0000E STA FACTOR1,MULTIPLY | Opcode |
| +122 | | | FACTOR1,MULTIPLY 0002 write | Write |

| | | | | |
|---|---|---|---|---|
| +123 | | MULTIPLY +0000F | ADA PRODUCT,MULTIPLY | Opcode |
| +124 | | PRODUCT,MULTIPLY | 0000 read | Read |
| +125 | | MULTIPLY +00010 | STA PRODUCT,MULTIPLY | Opcode |
| +126 | | PRODUCT,MULTIPLY | 0002 write | Write |
| +127 | | MULTIPLY +00011 | LDA FACTOR1,MULTIPLY | Opcode |
| +128 | | FACTOR1,MULTIPLY | 0002 read | Read |
| +129 | | NOADD,MULTIPLY | SBR 1 | Opcode |
| +130 | | MULTIPLY +00013 | SZB DONE ,MULTIPLY | Opcode |
| +131 | | DONE ,MULTIPLY | LDA PRODUCT,MULTIPLY | Opcode |
| +132 | | PRODUCT,MULTIPLY | 0002 read | Read |
| +133 | | MULTIPLY +00018 | RET 1 | Opcode |
| +134 | | STACK-0001F | 8027 read | Read |
| +135 | # 12 | FACTOR+00015 | STA FACTOR+0024 | Opcode |
| +136 | | FACTOR+00024 | 0002 write | Write |
| +137 | # 12 | FACTOR+00016 | ISZ FACTOR+0023 | Opcode |
| +138 | | FACTOR+00023 | 0002 read | Read |
| +139 | | FACTOR+00023 | 0003 write | Write |
| +140 | # 12 | FACTOR+00017 | LDA A | Opcode |
| +141 | # 12 | FACTOR+00018 | DSZ FACTOR+0025 | Opcode |
| +142 | | FACTOR+00025 | 0002 read | Read |
| +143 | | FACTOR+00025 | 0001 write | Write |
| +144 | # 12 | FACTOR+00019 | JMP FACTORIO1_L2 ,FACTOR | Opcode |

```
    SUM := SUM * I;
```

| | | | | |
|---|---|---|---|---|
| +145 | # 12 | FACTORIO1_L2 ,FA | LDA FACTOR+0024 | Opcode |
| +146 | | FACTOR+00024 | 0002 read | Read |
| +147 | # 12 | FACTOR+00013 | LDB FACTOR+0023 | Opcode |
| +148 | | FACTOR+00023 | 0003 read | Read |
| +149 | # 12 | FACTOR+00014 | JSM MULTIPLY_ENTRY,MULTIPLY | Opcode |
| +150 | | STACK-0001F | 8027 write | Write |
| +151 | | MULTIPLY_ENTRY,M | AND ML8,MULTIPLY | Opcode |
| +152 | | ML8,MULTIPLY | 00FF read | Read |
| +153 | | MULTIPLY +00005 | STA FACTOR1,MULTIPLY | Opcode |
| +154 | | FACTOR1,MULTIPLY | 0002 write | Write |
| +155 | | MULTIPLY +00006 | LDA Z+0008 | Opcode |
| +156 | | Z+00008 | 0008 read | Read |
| +157 | | MULTIPLY +00007 | STA LOOP_COUNT ,MULTIPLY | Opcode |
| +158 | | LOOP_COUNT ,MULT | 0008 write | Write |
| +159 | | MULTIPLY +00008 | LDA Z+0000 | Opcode |
| +160 | | Z+00000 | 0000 read | Read |
| +161 | | MULTIPLY +00009 | STA PRODUCT,MULTIPLY | Opcode |
| +162 | | PRODUCT,MULTIPLY | 0000 write | Write |
| +163 | | MULTIPLY +0000A | LDA FACTOR1,MULTIPLY | Opcode |
| +164 | | FACTOR1,MULTIPLY | 0002 read | Read |
| +165 | | MULTIPLY +0000B | SBL 8 | Opcode |
| +166 | | MULTIPLY +0000C | SBR 8 | Opcode |
| +167 | | MULT_LOOP,MULTIP | SLB NOADD,MULTIPLY | Opcode |
| +168 | | MULTIPLY +0000E | STA FACTOR1,MULTIPLY | Opcode |
| +169 | | FACTOR1,MULTIPLY | 0002 write | Write |
| +170 | | MULTIPLY +0000F | ADA PRODUCT,MULTIPLY | Opcode |
| +171 | | PRODUCT,MULTIPLY | 0000 read | Read |
| +172 | | MULTIPLY +00010 | STA PRODUCT,MULTIPLY | Opcode |
| +173 | | PRODUCT,MULTIPLY | 0002 write | Write |
| +174 | | MULTIPLY +00011 | LDA FACTOR1,MULTIPLY | Opcode |
| +175 | | FACTOR1,MULTIPLY | 0002 read | Read |
| +176 | | NOADD,MULTIPLY | SBR 1 | Opcode |
| +177 | | MULTIPLY +00013 | SZB DONE ,MULTIPLY | Opcode |
| +178 | | MULTIPLY +00014 | SAL 1 | Opcode |
| +179 | | MULTIPLY +00015 | DSZ LOOP_COUNT ,MULTIPLY | Opcode |
| +180 | | LOOP_COUNT ,MULT | 0008 read | Read |
| +181 | | LOOP_COUNT ,MULT | 0007 write | Write |

| | | | | |
|---|---|---|---|---|
| +182 | | | MULTIPLY +00016 JMP MULT_LOOP,MULTIPLY | Opcode |
| +183 | | | MULT_LOOP,MULTIP SLB NOADD,MULTIPLY | Opcode |
| +184 | | | MULTIPLY +0000E STA FACTOR1,MULTIPLY | Opcode |
| +185 | | | FACTOR1,MULTIPLY   0004  write | Write |
| +186 | | | MULTIPLY +0000F ADA PRODUCT,MULTIPLY | Opcode |
| +187 | | | PRODUCT,MULTIPLY   0002  read | Read |
| +188 | | | MULTIPLY +00010 STA PRODUCT,MULTIPLY | Opcode |
| +189 | | | PRODUCT,MULTIPLY   0006  write | Write |
| +190 | | | MULTIPLY +00011 LDA FACTOR1,MULTIPLY | Opcode |
| +191 | | | FACTOR1,MULTIPLY   0004  read | Read |
| +192 | | | NOADD,MULTIPLY   SBR 1 | Opcode |
| +193 | | | MULTIPLY +00013 SZB DONE ,MULTIPLY | Opcode |
| +194 | | | DONE ,MULTIPLY   LDA PRODUCT,MULTIPLY | Opcode |
| +195 | | | PRODUCT,MULTIPLY   0006  read | Read |
| +196 | | | MULTIPLY +00018 RET 1 | Opcode |
| +197 | | | STACK-0001F    8027  read | Read |
| +198 | # | 12 | FACTOR+00015 STA FACTOR+0024 | Opcode |
| +199 | | | FACTOR+00024    0006  write | Write |
| +200 | # | 12 | FACTOR+00016 ISZ FACTOR+0023 | Opcode |
| +201 | | | FACTOR+00023    0003  read | Read |
| +202 | | | FACTOR+00023    0004  write | Write |
| +203 | # | 12 | FACTOR+00017 LDA A | Opcode |
| +204 | # | 12 | FACTOR+00018 DSZ FACTOR+0025 | Opcode |
| +205 | | | FACTOR+00025    0001  read | Read |
| +206 | | | FACTOR+00025    0000  write | Write |

```
    FACTORIAL := SUM;
```

| | | | | |
|---|---|---|---|---|
| +207 | # | 13 | FACTORIO1_L1 ,FA LDA FACTOR+0024 | Opcode |
| +208 | | | FACTOR+00024    0006  read | Read |
| +209 | | | FACTOR+0001B STA FACTOR+0022 | Opcode |
| +210 | # | 13 | FACTOR+00022    0006  write | Write |

```
    END;
```

| | | | | |
|---|---|---|---|---|
| +211 | # | 14 | FACTOR+0001C RET 1 | Opcode |
| +212 | | | STACK-00020    8007  read | Read |
| +213 | # | 18 | MAIN+00006 LDB INDEX,MAIN | Opcode |
| +214 | | | INDEX,MAIN      0003  read | Read |
| +215 | # | 18 | MAIN+00007 ADB MAIN00_C ,MAIN | Opcode |
| +216 | | | MAIN00_C ,MAIN     8039  read | Read |
| +217 | # | 18 | MAIN+00008 STA B,I | Opcode |
| +218 | | | DATA_BLOC+00003    0006  write | Write |

```
    END;
```

| | | | | |
|---|---|---|---|---|
| +219 | # | 19 | MAIN+00009 ISZ INDEX,MAIN | Opcode |
| +220 | | | INDEX,MAIN      0003  read | Read |
| +221 | | | INDEX,MAIN      0004  write | Write |
| +222 | # | 19 | MAIN+0000A LDA A | Opcode |
| +223 | # | 19 | MAIN+0000B DSZ MAIN00_D ,MAIN | Opcode |
| +224 | | | MAIN00_D ,MAIN     0012  read | Read |
| +225 | | | MAIN00_D ,MAIN     0011  write | Write |
| +226 | # | 19 | MAIN+0000C JMP MAIN00_L2,MAIN | Opcode |

```
    DATA_BLOCK[INDEX] := FACTORIAL(INDEX);
```

| | | | | |
|---|---|---|---|---|
| +227 | # | 20 | MAIN00_L2,MAIN   JSM FACTORIAL,FACTOR | Opcode |
| +228 | | | STACK-00020    8006  write | Write |

```
    BEGIN
```

I claim:

1. A logic state analyzer for producing a symbolically annotated trace listing of selected logic states occurring during a target system's execution of a relocated machine code object program that was produced from a source program incorporating symbolic labels, and was linked and loaded, the logic state analyzer comprising:
   correspondence means, coupled to files associated with the linking and loading of the machine code object program, for producing a table of correspondence between symbolic labels used in the source program and corresponding absolute addresses within the relocated machine code object program that occur as states in the target system;
   trace specification means, coupled to the correspondence means, for specifying in terms of the symbolic labels a condition to be met by a logic state occurring in the target system in order for that logic state to be included in the selected trace;
   logic state acquisition means, coupled to the trace specification means, for coupling to the target system and acquiring the values of logic states that occur therein and satisfy the condition specified by the trace specification means;
   memory means, coupled to the logic state acquisition means, for storing numerically the values of the logic states acquired by the logic state acquisition means;
   conversion means, coupled to the correspondence means and to the memory means, for converting from numerical values into their associated symbolic labels those acquired logic state values stored in the memory means which have associated symbolic labels in the table of correspondence produced by the correspondence means; and
   output means coupled to the conversion means for producing an indication of the numerical values and symbolic labels of the logic states included in the trace.

2. A logic state analyzer as in claim 1 wherein the output means is additionally responsive to the source program from which the object program was produced, and wherein the indication produced by the output means includes, interspersed with portions of the numeric values and symbolic labels of the logic states included in the trace, those individual source program lines whose associated machine code object program execution resulted in the aforesaid portions.

3. A logic state analyzer as in claim 1 wherein the source program is compiled by a compiler and at least one correspondence in the table of correspondence pertains to a symbolic label appearing in a symbol table produced by that compiler.

4. A logic state analyzer as in claim 1 wherein the source program is assembled by an assembler and at least one correspondence in the table of correspondence pertains to a symbolic label appearing in a symbol table produced by that assembler.

5. A logic state analyzer as in claim 1 wherein at least one correspondence in the table of correspondence is supplied by the user of the logic state analyzer and associates the numerical value of a selected logic state in the target system with an auxiliary symbolic label chosen by the user to represent that selected logic state.

6. A logic state analyzer as in claim 1 wherein the indication produced by the output means comprises a visible indication.

7. A logic state analyzer as in claim 1 wherein the target system includes a memory management unit, coupled to the correspondence means, that dynamically alters correspondence between virtual addresses and physical addresses of a target system memory, and wherein the correspondence means is responsive to the dynamic alterations of the memory management unit by offsetting the absolute address associated with each symbolic label by an amount corresponding to each alteration in the correspondence between virtual and physical address.

8. A logic state analyzer as in claim 1 wherein at least one entry in the table of correspondence associates a symbolic label with a range of absolute addresses.

9. A logic state analyzer as in claim 8 wherein the conversion means converts a numerical value falling within the range of absolute addresses associated with a symbolic label into an offset relative to a selected value in that range and wherein the indication produced by the output means comprises that symbolic label and that offset.

10. A logic state analyzer for producing a symbolically annotated trace listing of selected logic state values occurring during the operation of a target system, the logic state analyzer comprising:
    correspondence means, responsive to the user of the logic state analyzer, for producing a table of correspondence between logic state values that occur during the operation of the target system and symbolic labels chosen by the user to represent those logic state values in lieu of their numeric representation;
    trace specification means, coupled to the correspondence means, for specifying in terms of the symbolic labels a condition to be met by a logic state value occurring in the target system in order for that logic state value to be included in the selected trace;
    logic state acquisition means, coupled to the trace specification means, for coupling to the target system and acquiring the values of logic states that occur therein and satisfy the condition specified by the trace specification means;
    memory means, coupled to the logic state acquisition means, for storing numerically the values of the logic states acquired by the logic state acquisition means;
    conversion means, coupled to the correspondence means and to the memory means, for converting from numerical values into their associated symbolic labels those acquired logic state values stored in the memory means which have associated symbolic labels in the table of correspondence produced by the correspondence means; and
    output means coupled to the conversion means for producing an indication of the numerical values and symbolic labels of the logic states included in the trace.

11. A logic state analyzer as in claim 10 wherein at least one entry in the table of correspondence associates a symbolic label with a range of logic state values.

12. A logic state analyzer as in claim 10 wherein the conversion means converts a numerical value falling within the range of logic state values associated with a symbolic label into an offset relative to a selected value in that range and wherein the indication produced by the output means comprises that symbolic label and that offset.

* * * * *